United States Patent
Karkheck et al.

(10) Patent No.: US 10,323,418 B2
(45) Date of Patent: Jun. 18, 2019

(54) VENT COVER ASSEMBLY FOR USE WITH ROOF-MOUNTED PHOTOVOLTAIC SYSTEMS

(71) Applicant: SolarCity Corporation, San Mateo, CA (US)

(72) Inventors: Johann Karkheck, San Rafael, CA (US); Brian Atchley, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 475 days.

(21) Appl. No.: 14/878,965

(22) Filed: Oct. 8, 2015

(65) Prior Publication Data

US 2016/0102885 A1    Apr. 14, 2016

Related U.S. Application Data

(60) Provisional application No. 62/083,853, filed on Nov. 24, 2014, provisional application No. 62/062,368, filed on Oct. 10, 2014.

(51) Int. Cl.
*F24F 13/20* (2006.01)
*E04D 13/147* (2006.01)
(Continued)

(52) U.S. Cl.
CPC .......... *E04D 13/1476* (2013.01); *F24F 13/20* (2013.01); *F24S 25/615* (2018.05);
(Continued)

(58) Field of Classification Search
CPC ..... E04D 13/1476; E04D 13/14; H02S 20/23; F24F 13/20; F24J 2/5249; Y02B 10/12; Y02E 10/47
(Continued)

(56) References Cited

U.S. PATENT DOCUMENTS 445,522 A    1/1891   Dellinger
510,884 A    12/1893  Bradley, Jr.
(Continued)

FOREIGN PATENT DOCUMENTS

EP    0753703 B1    5/2003
FR    1475051 A     3/1967
GB    2157786 A  *  10/1985   .............. F16B 2/246

OTHER PUBLICATIONS

"4 in. Vent Cap-VC4—The Home Depot," retrieved from the Internet on Nov. 12, 2015, from http://www.homedepot.com/p/Master-Flow-4-in-Vent-Cap-VC4/100396970?MERCH=RV-_-rv_nav_plp_rr-_-NA-_-100396970-_-N (2 pages).
(Continued)

*Primary Examiner* — Gregory L Huson
*Assistant Examiner* — Ryan L Faulkner
(74) *Attorney, Agent, or Firm* — Kilpatrick Townsend & Stockton LLP

(57) ABSTRACT

A vent cap assembly for use with a drain waste vent pipe under roof-mounted photovoltaic (PV) panels is provided. Such vent cap assemblies are adapted to fit over a cut-down roof vent pipe to maintain airflow from the vent pipe and prevent debris from entering the pipe. Vent cap assemblies can include a cap portion and a mounting bracket, the cap portion having an inner cavity accessed through an opening in an underside of the cap and the mounting bracket having one or more inwardly extending elongate members for engaging an outer surface of the vent pipe to secure the cap assembly to the pipe. The mounting bracket can include multiple inwardly extending tabs distributed about the bracket that laterally deflect and securely engage the vent pipe when the cap assembly is pressed onto the pipe.

20 Claims, 19 Drawing Sheets

(51) Int. Cl.
*H02S 20/23* (2014.01)
*F24S 25/615* (2018.01)
*E04D 13/143* (2006.01)

(52) U.S. Cl.
CPC ............ *H02S 20/23* (2014.12); *E04D 13/143* (2013.01); *Y02B 10/12* (2013.01); *Y02B 10/20* (2013.01); *Y02E 10/47* (2013.01)

(58) Field of Classification Search
USPC ...................................................... 454/367
See application file for complete search history.

(56) References Cited

U.S. PATENT DOCUMENTS

| | | | |
|---|---|---|---|
| 912,823 A | 2/1909 | Dehn | |
| 1,215,685 A * | 2/1917 | McGuire | F24F 7/02 454/367 |
| 1,264,056 A | 4/1918 | Geibig | |
| 1,606,410 A | 11/1926 | Frame | |
| 1,623,659 A | 4/1927 | Comerford | |
| 1,868,730 A | 7/1932 | Dowrie | |
| 1,921,943 A | 8/1933 | Rice et al. | |
| 2,461,729 A | 2/1949 | Glitsch | |
| 2,508,041 A | 5/1950 | Rapisarda et al. | |
| 2,550,353 A | 4/1951 | Hopfinger | |
| 2,601,820 A | 7/1952 | Paul et al. | |
| 2,692,548 A | 10/1954 | Knorr | |
| 3,183,822 A | 5/1965 | Stone et al. | |
| 3,361,051 A | 1/1968 | Fair et al. | |
| 3,403,809 A | 10/1968 | Kennedy et al. | |
| 3,538,402 A | 11/1970 | Kameron | |
| 3,579,930 A | 5/1971 | Murphy | |
| 3,650,198 A | 3/1972 | Stone | |
| 3,732,800 A | 5/1973 | Goettel | |
| 4,102,090 A | 7/1978 | Anguish | |
| 4,211,423 A | 7/1980 | Resech | |
| 4,265,058 A | 5/1981 | Logsdon | |
| 4,280,305 A | 7/1981 | Logsdon | |
| 4,297,818 A | 11/1981 | Anderson | |
| 4,333,660 A | 6/1982 | Cupit | |
| 4,386,488 A | 6/1983 | Gibbs | |
| 4,399,743 A | 8/1983 | Izzi, Sr. | |
| 4,461,066 A | 7/1984 | Peterson | |
| 4,526,407 A | 7/1985 | Kifer | |
| 4,545,291 A | 10/1985 | Kutsch | |
| 4,638,727 A | 1/1987 | Mitchell | |
| 5,010,700 A | 4/1991 | Blair | |
| 5,222,334 A | 6/1993 | Hastey | |
| 5,317,845 A | 7/1994 | Bodycomb | |
| 5,390,451 A | 2/1995 | Kopp et al. | |
| 5,472,241 A | 12/1995 | Kosik, Jr. et al. | |
| 5,561,952 A * | 10/1996 | Damron | E04D 13/0325 454/199 |
| 5,568,947 A | 10/1996 | Paquette | |
| 5,630,752 A | 5/1997 | Gubash | |
| 5,749,780 A | 5/1998 | Harder et al. | |
| 5,954,580 A * | 9/1999 | Adib | F24F 13/062 454/300 |
| 6,183,360 B1 | 2/2001 | Luter, II et al. | |
| 6,244,006 B1 | 6/2001 | Shue et al. | |
| 6,293,862 B1 | 9/2001 | Jafine et al. | |
| 6,302,787 B1 | 10/2001 | Graft, Jr. | |
| 6,447,390 B1 | 9/2002 | O'Hagin | |
| 6,612,924 B1 | 9/2003 | Mantyla et al. | |
| 6,767,281 B2 | 7/2004 | McKee | |
| 6,780,100 B1 | 8/2004 | Gretz | |
| 6,892,499 B1 | 5/2005 | Mayle | |
| 6,978,803 B2 | 12/2005 | Brown et al. | |
| 7,219,473 B2 | 5/2007 | Mantyla et al. | |
| 7,338,359 B2 | 3/2008 | Grossman et al. | |
| 7,484,533 B1 | 2/2009 | Arndt | |
| 7,784,242 B2 | 8/2010 | Warnecke | |
| D625,800 S | 10/2010 | Daniels | |
| 7,882,670 B2 | 2/2011 | West | |
| 7,930,858 B2 | 4/2011 | Lajewski | |
| 8,109,048 B2 | 2/2012 | West et al. | |
| 8,181,403 B1 | 5/2012 | Polston | |
| 8,209,923 B1 | 7/2012 | Rich | |
| D666,285 S | 8/2012 | Schrad et al. | |
| 8,240,093 B2 | 8/2012 | Lajewski | |
| 8,298,053 B2 | 10/2012 | Parry | |
| D672,450 S | 12/2012 | Milks et al. | |
| 8,375,654 B1 | 2/2013 | West et al. | |
| 8,397,438 B2 | 3/2013 | Hoy et al. | |
| 8,453,389 B2 | 6/2013 | Selke et al. | |
| 8,484,914 B2 | 7/2013 | Cline | |
| 8,534,002 B2 | 9/2013 | McDow, Jr. et al. | |
| 8,574,045 B2 | 11/2013 | Warner | |
| 8,650,833 B1 | 2/2014 | Polston | |
| 9,243,813 B2 | 1/2016 | Mantyla et al. | |
| 2004/0148883 A1 | 8/2004 | Lutz | |
| 2005/0011137 A1 | 1/2005 | Baker | |
| 2006/0211356 A1 | 9/2006 | Grassman | |
| 2006/0223437 A1 | 10/2006 | O'Hagin | |
| 2006/0240762 A1 | 10/2006 | Railkar et al. | |
| 2007/0173191 A1 | 7/2007 | Daniels, II et al. | |
| 2008/0070494 A1 | 3/2008 | Henry | |
| 2009/0113823 A1 | 5/2009 | Osborne | |
| 2010/0000166 A1 | 1/2010 | Lajewski et al. | |
| 2011/0000526 A1 | 1/2011 | West | |
| 2011/0294412 A1 | 12/2011 | Vagedes | |
| 2012/0073239 A1 | 3/2012 | Haines | |
| 2013/0328300 A1 | 12/2013 | Bond | |
| 2014/0065946 A1 | 3/2014 | Tovmasyan | |
| 2014/0106661 A1 | 4/2014 | Baldwin et al. | |
| 2014/0194053 A1 | 7/2014 | Carroll | |
| 2014/0246549 A1 | 9/2014 | West et al. | |
| 2015/0056903 A1 | 2/2015 | Nagano et al. | |
| 2015/0240499 A1 | 8/2015 | Wey | |
| 2016/0040898 A1 | 2/2016 | Lipinski | |
| 2016/0053499 A1 | 2/2016 | West et al. | |
| 2016/0102460 A1 | 4/2016 | West et al. | |

OTHER PUBLICATIONS

"A PVC eCap cap vent cover to protect pvc plumbing heating 90 percent vent pipes from birds, squirrels," retrieved from the Internet on Nov. 11, 2015, from http://savepipey.net/about-the-ecap.html (10 pages).

"Installation Guide—Critter Quitter," retrieved from the Internet on Nov. 11, 2015, from http://critterquitter.com/installation-guide/ (5 pages).

"JS26700—Josam 26700 Vandal Proof Vent Cap—Roof Drains by Commercial Plumbing Supply," retrieved from the Internet on Nov. 12, 2015, from http://commercialplumbingsupply.com/proddetail.asp?prod=JS26700 (2 pages).

"Oatey Mushroom Vent Cap 43805 | Zoro.com," retrieved from the Internet on Nov. 12, 2015, from http://www.zoro.com/oatey-mushroom-vent-cap-43805/i/G6227453/?utm_source=google_shopping&utm_medium=cpc&utm_campaign=Google_Shopping_Feed&gclid=CJK6oKbNkscCFYEYHwod54ALig&gclsrc=aw.ds (2 pages).

"OdorHog Vent Pipe Filter Products," retrieved from the Internet on Nov. 12, 2015, from http://www.odorhog.com/consumer.htm (4 pages).

"Plumbing Vent Caps—Vents—Old World Distributors, Inc.," retrieved from the Internet on Nov. 12, 2015, from http://www.oldworlddistributors.com/vents-plumbing-vent-caps/ (1 page).

"The Forever Cap 4 in. Round Fixed Stainless Steel Plumbing Vent Cap-FDVC4—The Home Depot," retrieved from the Internet on Nov. 12, 2015, from http://www.homedepot.com/p/The-Forever-Cap-4-in-Round-Fixed-Stainless-Steel-Plumbing-Vent-Cap-FDVC4/203735910 (2 pages).

\* cited by examiner

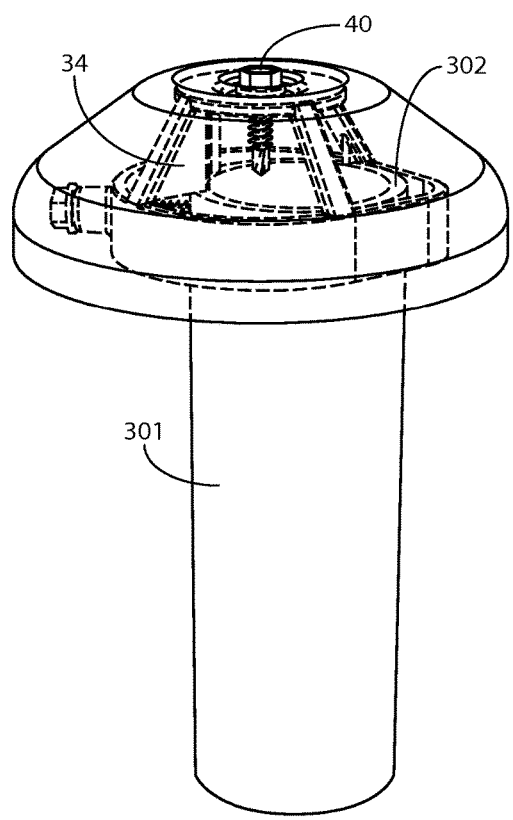
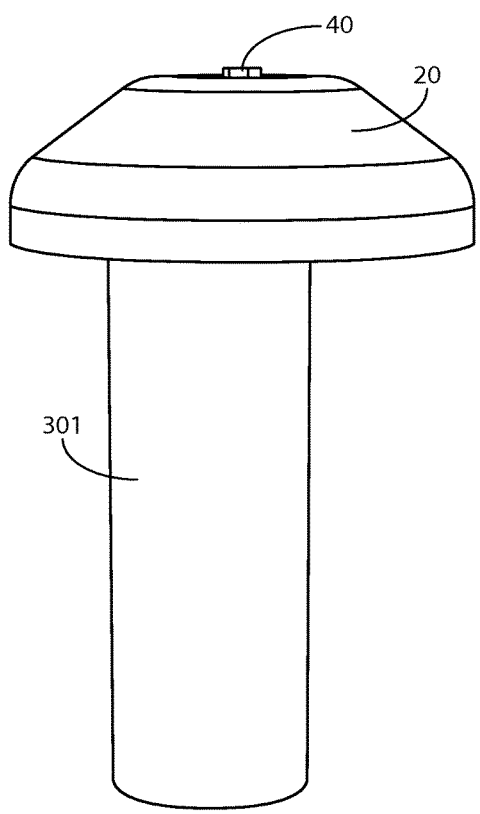
FIG. 7A    FIG. 7B
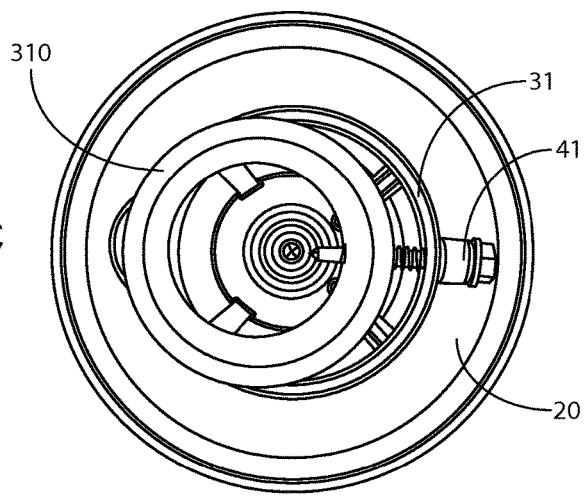
FIG. 7C

VENT COVER ASSEMBLY FOR USE WITH ROOF-MOUNTED PHOTOVOLTAIC SYSTEMS

CROSS REFERENCE TO RELATED APPLICATIONS

This claims the benefit of priority of U.S. Provisional Patent Application Nos. 62/062,368 filed on Oct. 10, 2014; and 62/083,853 filed on Nov. 24, 2014, each of which is incorporated herein by reference in its entirety.

This is related to U.S. Provisional Patent Application Nos. 62/040,174 filed on Aug. 21, 2014 and U.S. Non-Provisional application Ser. No. 14/831,342 filed on Aug. 20, 2015; each of which is incorporated herein by reference in its entirety for all purposes.

FIELD OF THE INVENTION

The instant invention relates generally to photovoltaic systems ("PV" or "solar") and in particular to roof-mounted solar systems on sloped roofs.

BACKGROUND

Solar power is becoming increasingly popular as a source of renewable energy as advances in panel efficiency and manufacturing techniques have driven down the cost per kilowatt. This has led to double-digit annual growth in solar installs and projections of even greater growth in the future. Another factor driving growth has been the availability of solar leases, power purchase agreements, and other financial products that allow customers to have solar systems installed with little or no money down. Also, in jurisdictions that allow net metering, excess power is sold back to the utility by reverse flow through the homeowner's power meter, further increasing the value proposition of solar.

Solar installation companies normally attempt to maximize the energy generating capacity of the array on the sun-facing portion of the roof up to the homeowner or business owner's level of electricity consumption. One problem, however, that often arises with rooftop installations is that roofs may contain one or more sewer gas exhaust pipes, also called drain waste vent pipes or drain waste vents. In some cases these pipes may protrude from the portion of the roof surface best suited for the solar array in an area that would otherwise be desirable to place a solar panel. To deal with this issue, project planners and installers often are forced to design and install the PV array to bypass these obstructions leaving a gap in the array and potentially limiting the number of panels that could otherwise be installed.

FIG. 1 illustrates this problem. FIG. 1 shows a portion of a residential roof 100 with installed solar array 200, which includes 23 individual solar panels 200. As used herein, the terms "module" and "panel" will be used interchangeably to refer to a solar or photovoltaic panel, which can include a string of solar cells encased in a frame or other protective structure that converts impinging photons into electrical current. As shown in array 200 of FIG. 1, there is no panel at spot 205 due to the presence of sewer gas exhaust vent 300. Although in FIG. 1 vent 300 is shown near the middle of the top row of solar panels, it should be appreciated that in practical application, vent 300 may exist nearly anywhere in roof 100 and displace a panel in array 200 leaving a hole somewhere in the middle or a gap along either side. Moreover, even though only one vent 300 is shown in FIG. 1, it is not uncommon to have two or more vents clustered in a single roof above the positions of the waste water lines, particularly in larger homes.

Solar panel array 200 is shown in FIG. 1 in a portrait or "North-South" orientation. In practice, arrays may be installed using an East-West or landscape orientation, or even at some angle in between portrait and landscape.

In addition to detracting from the aesthetics of the install, each gap in the PV array that could have otherwise supported a solar panel represents less revenue for the array owner—whether it's the homeowner or a panel installer/leaser—in an amount equivalent to multiple times the cost of the installed panel. If the average install is about five kilowatts and each panel is capable of generating 250 Watts, as much as five percent of the solar potential could be lost on an install with only one missing panel. If the array is an area that receives on average 5 hours of sunlight per day over the course of a year, this amounts to a loss of nearly 7,000 kilowatt hours in 20 years (assuming 75% efficiency).

Unfortunately, drain waste vent pipes cannot be removed because they serve an important function. They equalize atmospheric pressure to the sewer stack so that shower, tub, sink and toilet drains will all drain properly. They also allow flammable and potentially harmful sewer gases to vent above the building so that they do not accumulate within any living space inside the building. Although there are alternatives to roof venting, such as air admittance valves (AAVs), so-called Durgo valves or Studor vents, they are not in widespread use. These are one-way mechanical vents that eliminate the need for conventional roof venting. A discharge of wastewater, such as from a toilet flush causes the AAV to open, releasing the vacuum and allowing air to enter the plumbing system for proper drainage to occur. Such valves are more commonly used in Europe and are even prohibited by code in some jurisdictions, which may explain why roof vents are essentially ubiquitous in the United States. Also, replacing existing sewer gas venting with AAVs within the house is not a viable solution because it would significantly increase the time and cost of a PV system install.

FIG. 2 shows a close-up perspective view of sewer gas roof vent 300 depicted in FIG. 1. Vent 300 includes a protruding metal or PVC vent pipe 301 with pipe opening 302. Although not shown in the Figure, pipe 301 typically runs down to either the sewer stack within the residence or into one of the wastewater drainage pipes that feeds into the stack somewhere before it reaches the stack. In order to prevent water leakage, flashing plate 310 is usually slid down over pipe 301 from the open end through an opening in rubber collar 312. Flashing plate 310 may also have raised portion 311 to compensate for the pitch of the roof (i.e., the pipe does not penetrate flashing plate 310 normal to its surface, but rather at an angle off of normal specified by 90 degrees minus the pitch of the roof). In some cases raised portion 311 may be eliminated and rubber collar 312 will instead be shaped to compensate for roof pitch. In a shingled roof, such as that depicted in FIG. 2, the top and optionally the side portions of flashing plate 310 may be tucked underneath the surrounding roof shingles so that water running down the roof will run over the flashing plate without leaking through the roof.

It is possible on certain homes that no flashing plate is present. This could be due, for example, to the addition of a new roof, poor original construction, or non-standard repairs. In such cases, a large bead of caulk, tar, or other sealant may be placed around the opening in the roof where vent pipe 301 penetrates the roof to prevent water from leaking through the roof.

FIG. 3 shows an isolation perspective view of a flashing plate such as that shown in FIGS. 1 and 2; FIG. 4 is a side view of the exhaust pipe and flashing plate on a roof with an existing solar panel array. Flashing plate 310 is typically constructed from sheet metal such as aluminum, steel, or other suitable durable material. As discussed above, plate 310 may have raised portion 311 that creates a horizontal or substantially horizontal pedestal for attaching rubber collar 312. Collar 312 has opening 313 sized such that it creates a waterproof friction fit with pipe 301 when slid over pipe 301, thereby preventing the ingress of water.

FIG. 4 shows flashing plate 310 on roof 100 with solar panel array 200. Solar panel array 200 stops down-roof from plate 310 and pipe 301 because pipe 301 extends higher than the array. In FIG. 4, array 200 is installed on roof 100 in a strutless configuration using a height-adjustable mounting assembly comprising mounting puck 211, adjustable leveling screw 212, and male groove connector 212 that clips into grove 251 formed in panel frame 250. As can be seen in FIG. 4, the presence of exhaust pipe 301 prevents placement of a solar panel over the roof in the area where vent 300 is located. Therefore, it would be desirable to provide roof venting in a manner that allows placement of solar panels over areas being used for exhaust venting without substantially impeding exhausting venting and with minimal complication and expense.

BRIEF SUMMARY

The invention relates to vent cap assemblies for mounting on a drain waste vent pipe beneath roof-mounted solar systems. In particular, the invention relates to vent cap assemblies having a cap portion attached to a mounting portion. The cap portion is adapted to cover and protect the vent pipe from debris and maintain sufficient clearance for venting and air-flow and the mounting portion is adapted to engage the roof vent pipe so as to secure the vent cap assembly to the vent pipe.

In various embodiments, the vent cap assembly includes a cap portion having an opening to an interior cavity, the opening and interior cavity being dimensioned so as to receive an end of an exhaust gas vent pipe within the interior cavity through the opening and a mounting portion extending at least partly about a perimeter of the opening, the mounting bracket having one or more elongate members extending inwardly from the perimeter of the opening to engage an outer surface of the exhaust gas vent pipe sufficiently to secure the cap assembly to the exhaust gas vent pipe. The cap portion can include cap body defining the interior cavity and the mounting portion can be defined as a mounting bracket secured to the body of the cap at or near the perimeter of the opening with one or more elongate members extending inwardly to engage the vent pipe. The one or more elongate member may include a screw or multiple deflectable tabs distributed about the perimeter of the opening. In some embodiments, the cap portion and mounting portion are separately formed components that are securely attached to one another. In some embodiments, the mounting bracket is an integrally formed metal component.

In various embodiments, the mounting portion includes a mounting bracket, typically a circular mounting bracket ring, having multiple elongate members extending inwardly towards a center of the mounting bracket. The multiple elongate members are laterally deflectable toward the interior cavity of the cap portion such that deflection of the elongate members when the exhaust gas vent pipe is received facilitates retention of the exhaust gas vent pipe within the interior cavity. The elongate members can be dimensioned to receive exhaust gas vent pipes of differing sizes within a range of sizes, typically a pre-determined range of vent pipe sizes, such as a range between 1.5" and 2" vent pipes. In one aspect, the elongate members are plastically deformable so as to provide retention of the exhaust gas vent pipe within the interior cavity after being deflected upon receiving the exhaust gas vent pipe within the cavity.

In various embodiments, the multiple elongate members of the mounting brackets are defined as multiple tabs adapted for engaging the outer surface of the exhaust gas vent pipe. The tabs can include an inwardly curved distal edge that corresponds to the outwardly curved surface of the vent pipe. In some embodiments, the tabs may include a distal gripping surface, such as a serrated edge, to improve engagement between the tabs and vent pipe.

In various embodiments, the vent cap assembly may include one or more ribs that act as a stop against the top edge of the end opening of the vent pipe when the vent cap assembly is mounted thereon. The one or more ribs may be provided on the mounting bracket or on an inside surface of the inner cavity of the cap portion opposite the opening through which the vent pipe extends. The one or more ribs are adapted and dimensioned to maintain sufficient clearance between the end of the exhaust vent pipe and an inside surface of the cavity.

In various embodiments, the cap comprises a substantially smooth outer surface so as to provide a weatherproofing cover when secured on the exhaust gas vent pipe. In some embodiments, the cap may have a convex shape, such a mushroom or semi-spheroidal shape. The cap and mounting portions may be formed of differing materials or the same material.

In various embodiments, the mounting bracket is secured just inside the cavity opening of the cap such that the outer surface of the cap extends below the mounting bracket when the assembly is secured on the exhaust gas vent pipe. The multiple elongate members can be defined by three or more elongate members distributed about the bracket inside the perimeter of the cap opening so as to distribute anchoring by the elongate members about the exhaust gas vent pipe.

In various embodiments, the mounting bracket includes one or more alignment features to facilitate alignment and centering of the vent cap assembly on the vent pipe during mounting. Such alignment features may include fingers on the one or more tabs, the fingers being angled downwards and outward so as to engage an outer edge of the vent pipe opening. Such alignment features can also include one or more alignment tabs extending inwardly further than the one or more elongate members to facilitate centering of the mounting bracket on vent pipes having reduced diameters.

In various embodiments, the mounting portion and cap portion can include corresponding coupling features for attaching the mounting portion and cap portion. In some embodiments, the coupling features can include holes in each of the mounting portion and cap portion through which a screw is inserted. In other embodiments, the coupling features can include retention tabs on the mounting bracket protruding upwards for insertion into corresponding retention slots on an underside of the cap portion. The retention tabs can include downwardly angled barbs that engage the side-walls inside the retention slots to further improve retention of the retention tabs within the slots.

In various embodiments, the cap portion can include ribs or spacers adapted to facilitate mounting of the vent cap assembly onto vent pipes of differing size. Such ribs or spacers can include a central portion or recessed portion dimensioned to abut against an edge of the end of the vent pipe. In some embodiments, the cap portion includes ribs that include a flattened central portion that corresponds to a range of vent pipe diameters and one or more ramped surfaces on either side of the central region that guide the top surface of the vent pipe toward the central region. In some embodiments, the ribs include a central region dimensioned to allow for mounting on a range of vent pipe sizes. For example, the central region can be dimensioned to allow for mounting of a 1.5-inch diameter vent pipe on one end of the central region and mounting to a 2-inch diameter vent pipe on the other end of the central region. It is appreciated that such spacers or ribs can be dimensioned to allow various other ranges of vent pipe diameters as desired.

In various embodiments, the vent cap assembly includes a dome-shaped cap portion having an opening to an interior cavity, each being dimensioned to receive an end of an vent pipe within the interior cavity through the opening and a mounting bracket attached to the cap portion and extending at least partly about a perimeter of the opening. The interior cavity may include a spacer to maintain an air gap between the end of the vent pipe and an underside of the cap portion. The mounting bracket may include a plurality of flanges (e.g. tabs 35 in FIG. 8B) extending inwardly from the perimeter of the opening for engaging an outer surface of the exhaust gas vent pipe to secure the cap assembly to the exhaust gas vent pipe. In some embodiments, at least two of the plurality of flanges (e.g. tabs 35, 37 in FIG. 13B) may extend inwardly from the perimeter at different lengths to accommodate vent pipes of different diameters.

In various embodiments, the vent cap assembly includes a cap portion having an opening to an interior cavity and an adapter. The interior cavity includes a spacer adapted to limit penetration of a vent pipe under the cap portion and maintain an air gap between an opening of the vent pipe and an underside of the cap portion. The adapter includes a semi-circular portion having a corner and at least one set screw opposite from the corner. The semi-circular portion is dimensioned to fit over the end of a vent pipe and the corner allows the adapter to fit over pipes of different diameters. In some embodiments, the assembly includes at least one spacer offset from the semi-circular portion to limit the degree to which the adapter can slide down the end of the vent pipe. A pedestal portion may also be included for supporting the cap portion.

BRIEF DESCRIPTION OF THE DRAWINGS

FIGS. 7A-7C show several views of the example vent cap assembly of FIG. 6A mounted on a vent pipe in accordance with some embodiments.

DETAILED DESCRIPTION

Figure 1:
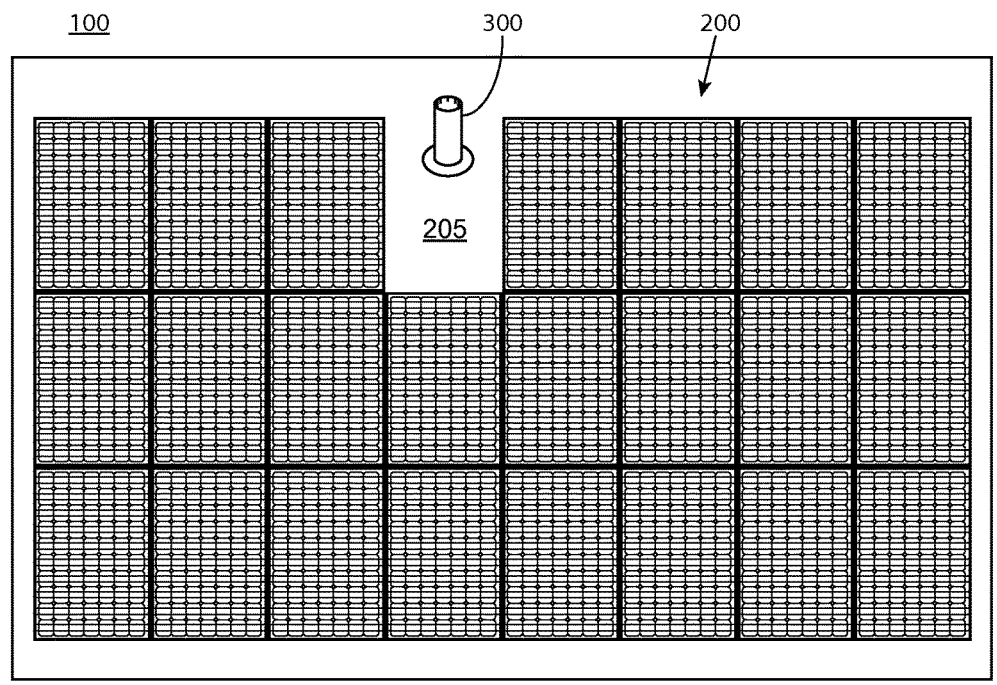
FIG. 1 shows a roof-mounted photovoltaic system that includes a gap to provide clearance for a conventional exhaust vent according to the prior art.
Figure 2:
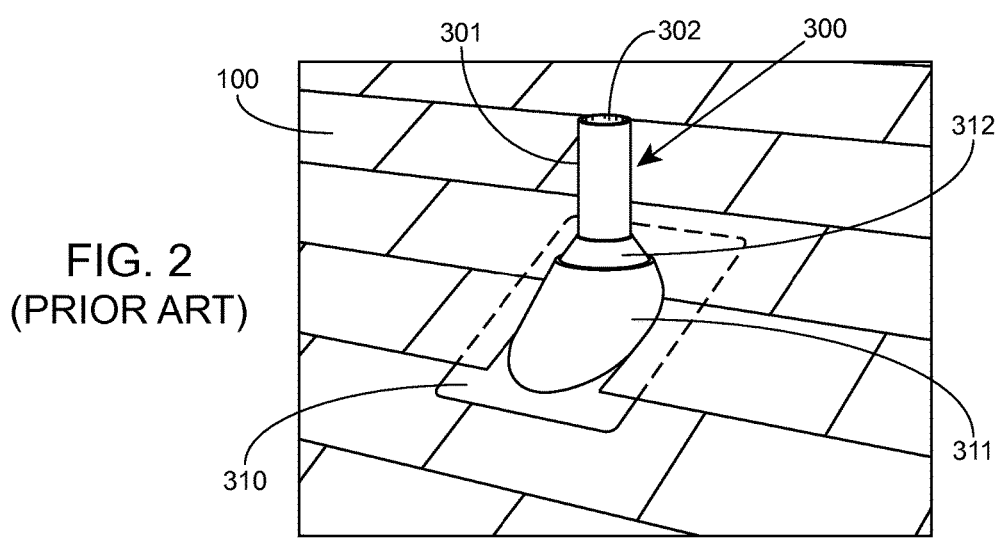
FIGS. 2 and 3 show a conventional roof exhaust vent according to the prior art.
Figure 3:
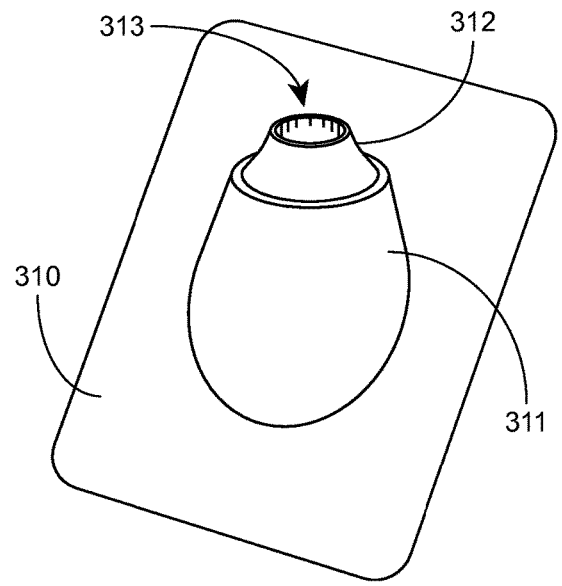
Figure 4:
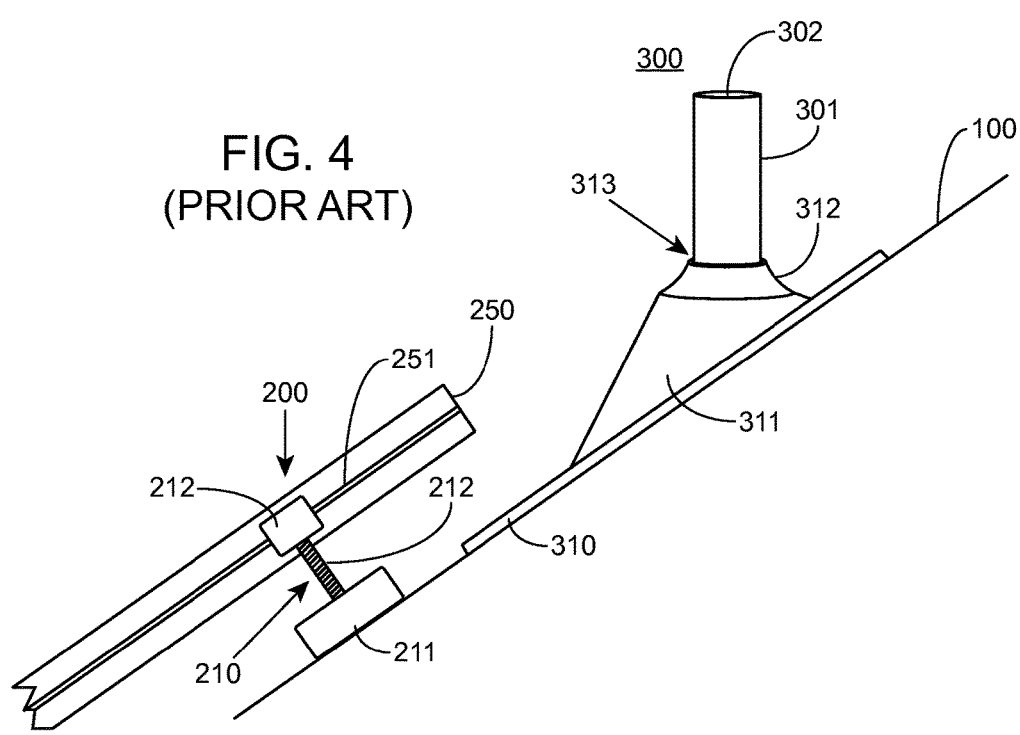
FIG. 4 shows a side view of a roof-mounted photovoltaic system adjacent a conventional roof exhaust vent according to the prior art.

Venting assemblies in accordance with embodiments of the invention can include venting cap assemblies that mount directly on a roof pipe vent beneath roof-mounted solar panels. The vent cap assemblies according to the various embodiments of the invention may fit over a cut-down roof vent pipe and fixedly attach to the vent pipe so as to cover the roof vent pipe and maintain sufficient airflow to facilitate exhaust through the vent pipe.

In one aspect, a vent cap assembly in accordance with embodiments of the invention includes a cap portion and a mounting portion, the cap portion defining a cap or cover that fits over the exhaust vent pipe and the mounting portion being adapted to secure the cap portion to the vent pipe. In some embodiments, the cap portion includes a cap body having an opening to an inner cavity dimensioned to receive the vent cap and the mounting portion includes a mounting bracket fixedly attached to the cap portion and having one or more inwardly extending elongate members that engage the vent pipe sufficiently to secure the cap assembly to the vent pipe. It is appreciated that the cap portion and mounting portion may be formed integrally as a single piece or may include separate components that are fixedly attached. Components of the vent cap assembly may be attached using various means, such as with an adhesive, friction fit, snap-fit, or various coupling features, such as any of those described herein.

In another aspect, the vent cap assembly may be adapted so that a user can readily fit the cap over an exhaust vent pipe and press the cap assembly down over the exhaust vent pipe thereby engaging the one or more inwardly extending members of the mounting portion with the vent pipe to secure the cap assembly to the vent pipe. In some embodiments, the mounting bracket includes inwardly extending members that are deflectable so that the cap assembly can be mounted on a vent pipe by pressing with a single hand of the user. The one or more deflectable members may be formed, at least in part, of a plastically deformable material having sufficient strength and rigidity so that once the one or more deflectable members are deflected against the vent pipe, the members retain their deflected configuration sufficiently to anchor or secure the cap assembly to the vent pipe. In some embodiments, the mounting portion and associated deflectable members are formed of a metal (e.g. aluminum, stainless steel) so as to provide sufficient strength and rigidity to adequately secure the cap assembly to the vent pipe yet still be flexible enough to bend when pushed down over the open end of a metal or PVC vent pipe.

In yet another aspect, the cap assembly is adapted for use with vent pipes of differing sizes. Since the cap assembly is anchored by laterally deflected members of the mounting bracket, the cap assembly can provide sufficient anchoring and accommodate both larger and smaller vent pipes (e.g. 2" pipes and 1.5" pipes), the deflectable members deflecting more when the cap is applied to a larger pipe as compared to when the cap assembly is applied to a smaller diameter vent pipe.

In yet another aspect, the cap assembly may include a rib that acts as a stop against the top edge of the vent pipe. The rib may be dimensioned so as to provide adequate clearance above the top edge of the vent pipe to ensure air-flow through the opening of the vent pipe is maintained. Such a rib may be included on either the mounting portion or the cap portion. The rib may be further be dimensioned to facilitate alignment and centering of the cap assembly during installation, such as by use of a flattened or level central region and one or more ramped or inclined surfaces on either side of the flattened central region. This central region provides a range of positions of the top edge of the vent pipe relative the cap that are suitable for mounting, while the ramped or inclined surfaces may assist in guiding the cap when being pressed onto the vent pipe.

In yet another aspect, the cap may include one or more alignment or centering features to facilitate installation of the cap assembly on a vent pipe. Such features may include inwardly extending tabs of varying length. Such tabs may include an angled or bent distal end portion for engaging an inner edge of the top surface of the vent pipe during installation. Such tabs may also include downwardly angled fingers that engage an outside surface along the top edge of the vent pipe to ensure the cap assembly is centered before being pushed on the vent pipe.

Various aspects of vent cap assemblies in accordance with aspects of the invention can be further understood by referring to the example embodiments in FIGS. 5-18B, which are described in detail below.

Figure 5:
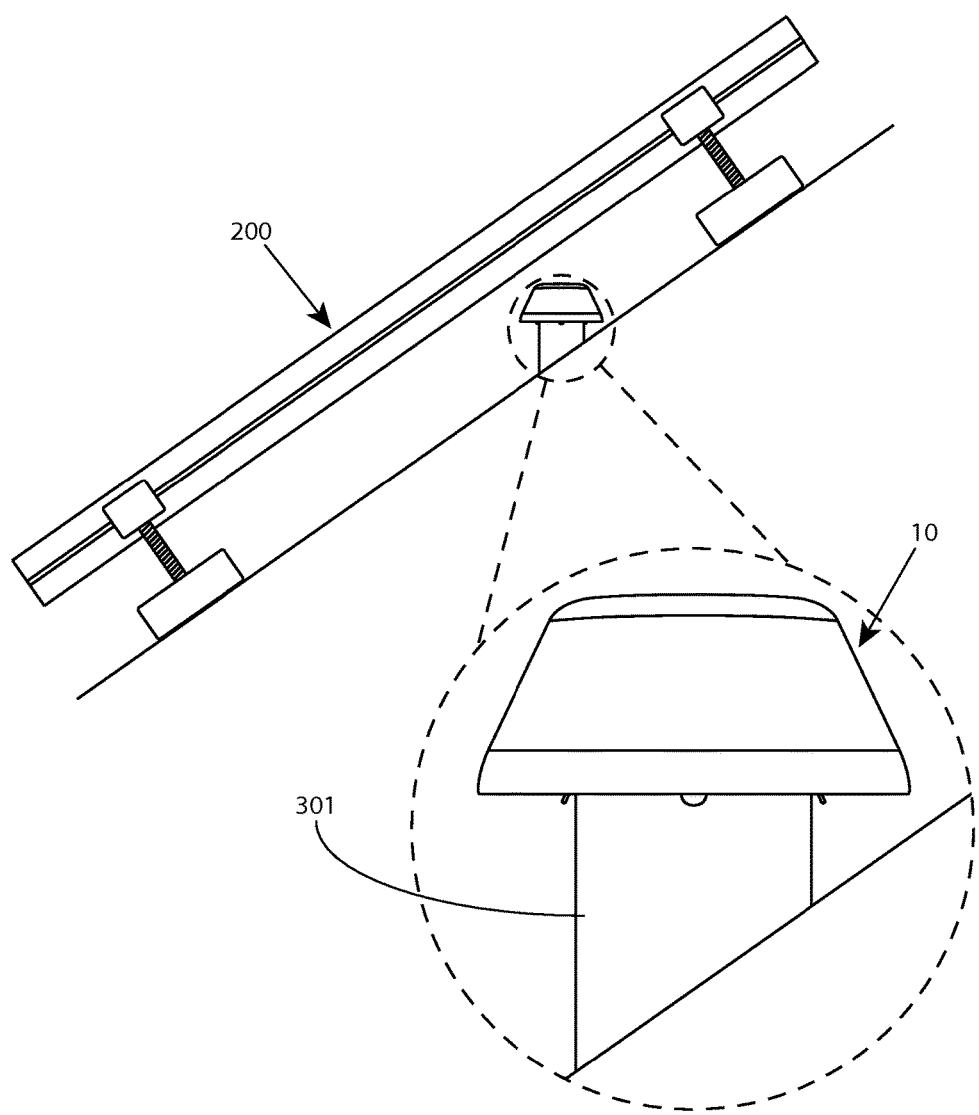
FIG. 5 shows a side view of an example vent cap mounted on a vent pipe under a roof-mounted photovoltaic systems in accordance with some embodiments.

FIG. 5 shows example exhaust gas vent cap 10 mounted on exhaust gas vent pipe 301 under roof-mounted photovoltaic system 200 in accordance with some embodiments. Since roof exhaust gas vent pipes typically extend about one-foot or more above the roof surface, the roof vent pipe will often need to be cut down, such as with a hack saw, to a height that allows for installation of a roof-mounted photovoltaic panels directly over the vent pipe. Although some local codes require that the vent pipe extend at least 6" above the roof, often vent pipes extend a greater distance for various reasons. For example, in snowy regions, the required vent pipe height is increased in relation to average snowfall. Since cutting down the roof vent pipe positions the opening of the vent pipe closer to the roof surface and the underside of the photovoltaic panels where rainwater and debris may collect, vent cap assembly 10 prevents rainwater and debris as well as pests or bugs from entering the opening of the vent pipe and maintains air-flow through the roof vent opening. In some embodiments, vent cap assembly 10 is provided to a user (e.g. photovoltaic installer) fully assembled as a single assembly or component so that the user can apply vent cap assembly 10 to the cut-down vent pipe and press down to secure cap assembly 10 to roof pipe 301. In other embodiments, the vent cap assembly may be provided in components and assembled during mounting to exhaust vent pipe 301.

Figure 6A:
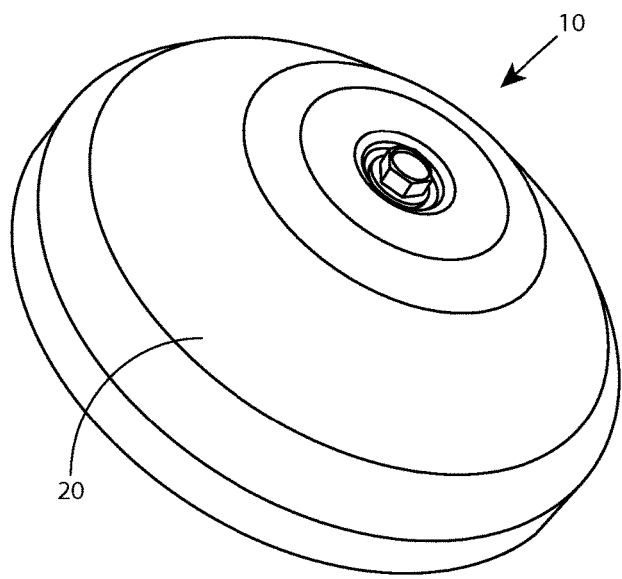
FIGS. 6A-6C show several views of an example vent cap assembly for use with roof-mounted photovoltaic systems in accordance with some embodiments.
Figure 6B:
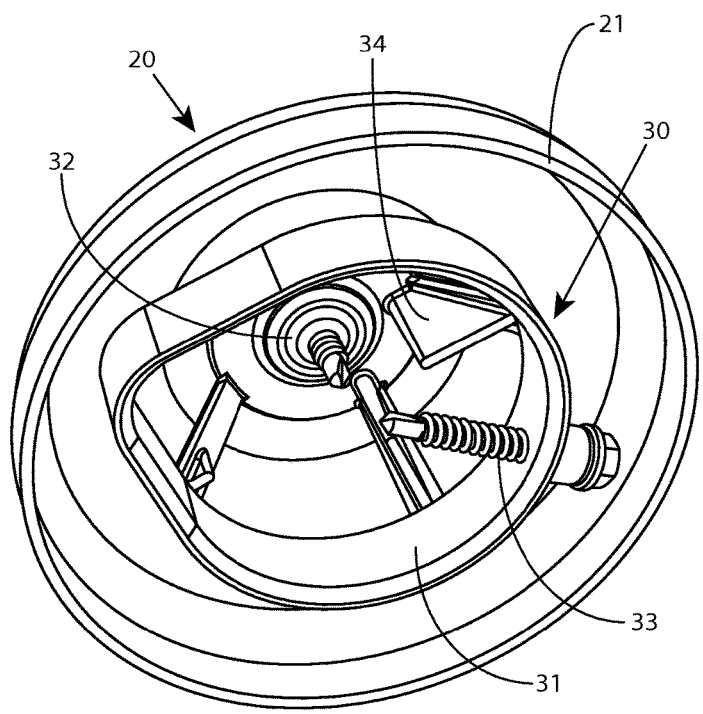
Figure 6C:
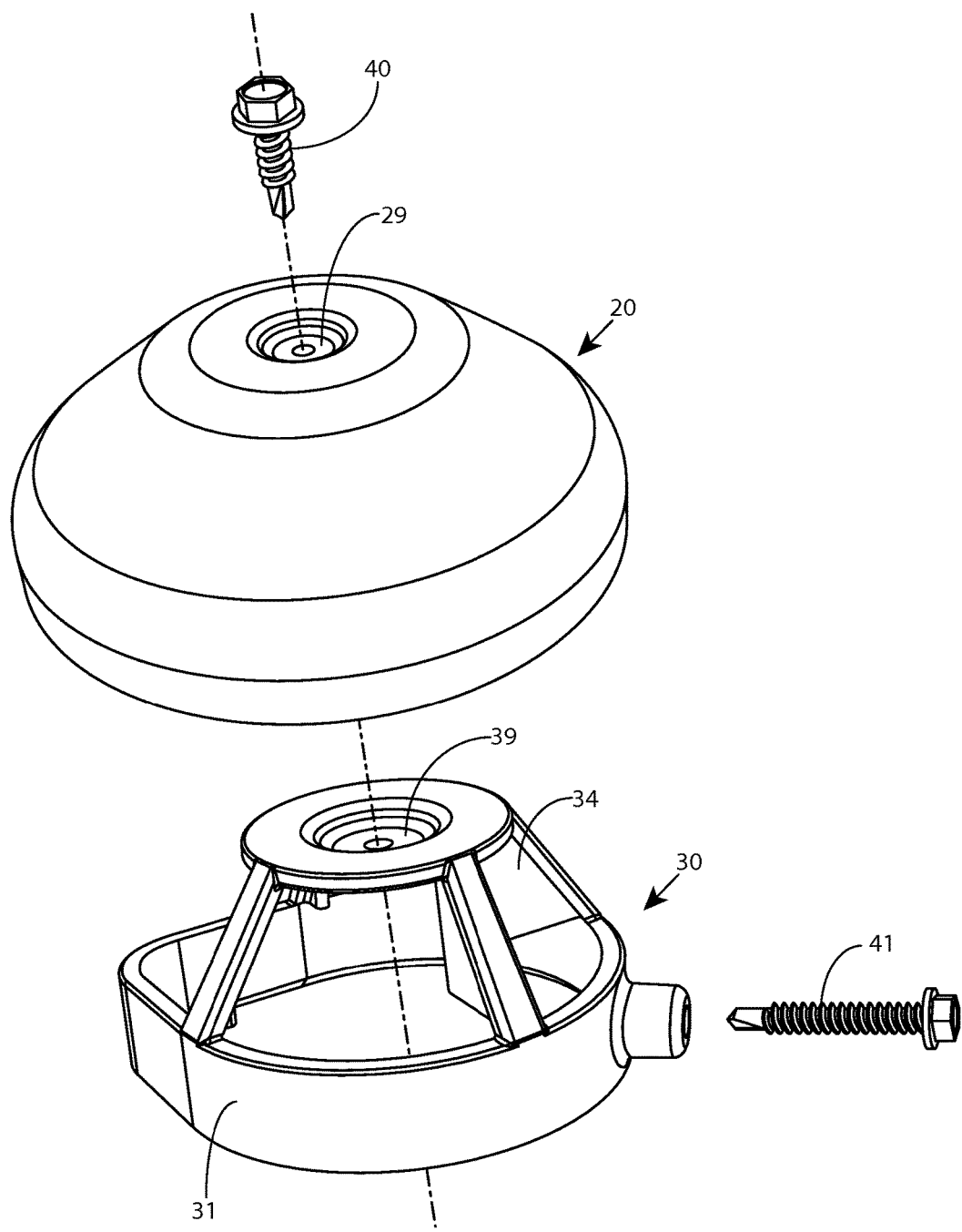

FIGS. 6A-6C show top and bottom views of another example exhaust gas cap vent assembly 10 for use with roof-mounted photovoltaic systems in accordance with some embodiments. As in various embodiments, this cap vent assembly includes a cap portion and a mounting portion. The cap portion includes cap body 20 that defines an inner cavity accessible through opening 21 on an underside of cap body 20. Cap body 20 further includes hole 29 in a top surface through which cap 20 can be attached to the mounting portion through corresponding hole 39 by use of screw 40. Cap body 20 is of a generally dome, convex or mushroom shape, although it is appreciated that the cap may be formed in various other shapes suitable for covering the vent pipe 301. For example, an oval or pill shaped cap may be useful in order to provide more clearance between an up roof edge of the cap and the adjacent roof surface. The mounting portion includes mounting bracket 30 that extends about an inside of the perimeter of cap opening 21. Mounting bracket 30 includes mounting ring 31 dimensioned to fit over and circumscribe roof vent pipe 301 when installed thereon. Mounting bracket 30 includes one or more inwardly extending members for engaging the outer surface of roof vent pipe 301. In this embodiment, mounting ring 31 has a tear-drop shape so as to allow the mounting bracket ring 31 to fit over roof vent pipes of differing diameters and be secured by use of a single inwardly extending member 33. In this example, the inwardly extending member 33 is defined by screw 41. Mounting bracket 30 further includes one or more ribs 34 for abutting against a top edge of vent pipe 301 and hole 39 through which screw 40 can be inserted to secure cap body 20 to the mounting bracket.

FIG. 6C shows an exploded view of the vent cap assembly in FIG. 6A. Typically, when installing this embodiment, the user first cuts down roof-vent pipe to a suitable height. The user then places the mounting bracket 30 over the cut-down vent pipe 301 and advances mounting bracket ring 301 over vent pipe 301 until one or more ribs 34 of the bracket abut against the top edge of vent pipe 301. Self-tapping screw 41 is then turned until it engages or advances through a side-wall of vent pipe 301, thereby securing mounting bracket 30 to roof vent pipe 301. The user then attaches cap body 20 to mounted bracket 30 by placing the cap over the bracket and inserting screw 40 through the corresponding holes in each.

FIGS. 7A-7B show side views of example exhaust gas cap vent assembly 10 of FIG. 6A mounted on exhaust gas vent pipe 301 and FIG. 7C shows an underside view in which self-tapping screw 41 can be seen extending through the side-wall of vent pipe 301 in accordance with some embodiments. Although in this embodiment screw 40 is used to attach the cap and mounting bracket and self-tapping screw 41 is used as the inwardly extending member to mount the mounting portion to the vent pipe, it is appreciated that various other means may be used to attach the cap to the mounting bracket (e.g. adhesive, snaps, friction-fit, threaded fittings) and various other members or screws may be used to secure the mounting bracket to vent pipe 301.

Figure 8A:
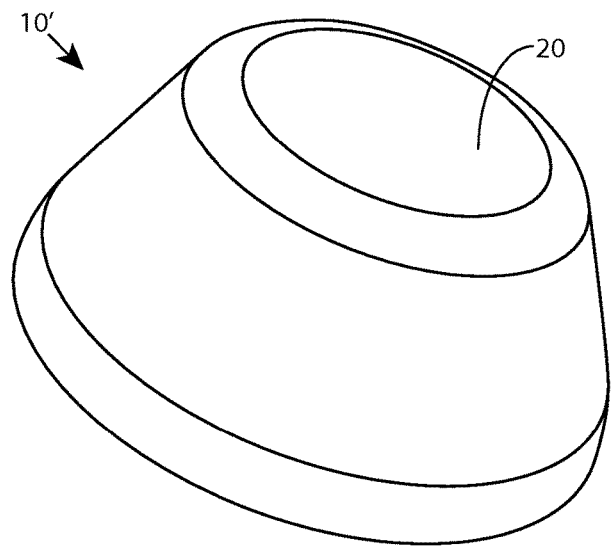
FIGS. 8A and 8B show top and bottom views, respectively, of an example vent cap assembly for use with roof-mounted photovoltaic systems in accordance with some embodiments.
Figure 8B:
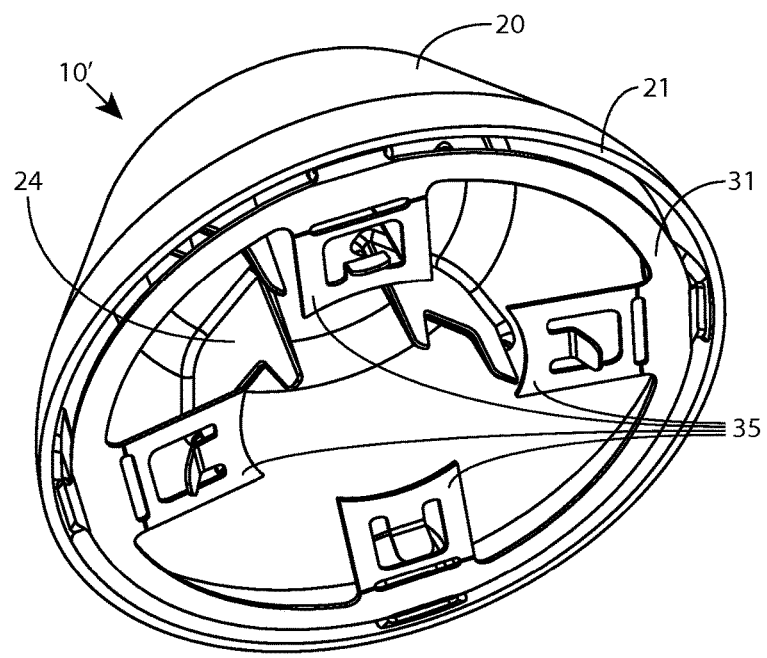

FIGS. 8A and 8B show top and bottom views, respectively, of another example exhaust gas cap vent assembly 10' for use with roof-mounted photovoltaic systems in accordance with some embodiments. In this embodiment, cap 20 defines an inner cavity accessible through circular opening 21 on an underside of cap 20. Cap 20 is of a similar shape as in the previous example, except that cap 20 has a substantially continuous smoother outer surface as the cap 20 does not require a top hole for attaching to the mounting portion. Rather, cap 20 utilizes corresponding coupling features for attaching to mounting bracket 31, such as those shown in detail in FIG. 8C. Cap 20 further includes ribs 24 within the inner cavity for abutting against the top edge of vent pipe 301 during installation. Mounting bracket 31 includes mounting bracket ring 31 that extends about the inside of the perimeter of opening 21 and includes plurality of tabs 35 forming inwardly extending members that engage the outer surface of vent pipe 301. Typically, tabs 35 are distributed equally about the inside of mounting bracket ring 31 so as to distribute any anchoring forces equally about the mounting bracket to maintain the position of the cap assembly 10' when mounted to vent pipe 301. Tabs 35 are adapted to be deflectable such that they laterally deflect (e.g. out-of-plane deflection) when the cap assembly is pressed onto vent pipe 301. Such a configuration allows the plurality of tabs to engage and secure with vent pipes of differing diameters. In another aspect, the cap assembly can be configured to prevent bugs or pests from climbing into the end of the vent pipe. In some embodiments, the cap assembly may include an additional feature, such as a screen or additional projections, that prevents bugs or pests from entering the interior cavity of the cap when mounted on the vent pipe. In some embodiments, the retaining tabs may be distributed about the opening of the cap in a sufficient quantity to inhibit entry of bugs into the interior of the cap, yet still provide sufficient flow of air from the vent pipe. In one aspect, the same members that are holding the cap in place can also screen the interior of the cap from pests. Such a configuration may be advantageous because the spring tension in the tabs that retains the cap on the vent pipe also prevents the tabs from changing position so that any screening function remains intact over time.

In one aspect, the plurality of tabs 35 are deformable and have sufficient strength and rigidity so that once the plurality of tabs are deflected when the cap assembly is pressed down onto vent pipe 301, the plurality of tabs 35 maintain their deflected position so as to retain the cap assembly in the mounted configuration. In one aspect, the distal edge of the tabs 35 may be curved inwardly so as to correspond with the outwardly curved surface of vent pipe 301. This aspect further improves engagement between the tabs 35 and vent pipe to allow mounting bracket to impart improved retention forces as compared to a tab having a straight distal edge. This will also tend to resist disconnection because pulling up on the cap will cause tabs 35 to dig into vent pipe 301. In some embodiments, the plurality of tabs are sufficiently flexible to allow the user to install cap assembly 10' on vent pipe 301 and laterally deflect the plurality of tabs by manually pressing the cap assembly onto vent pipe 301 with a single hand without requiring use of additional tools. Such a configuration allows cap assembly 10' to be provided to a user fully assembled and mounted to vent pipe 301 without disassembling the cap assembly, thereby improving ease of installation. The plurality of tabs 35 can be formed integrally with the mounting bracket, for example formed as a single components stamped from a sheet of metal (e.g. aluminum, stainless steel), although it is appreciated that the plurality of tabs may be formed of various other materials or may be separate components attached to the mounting bracket by various other means (e.g. screws, rivets).

Figure 9:
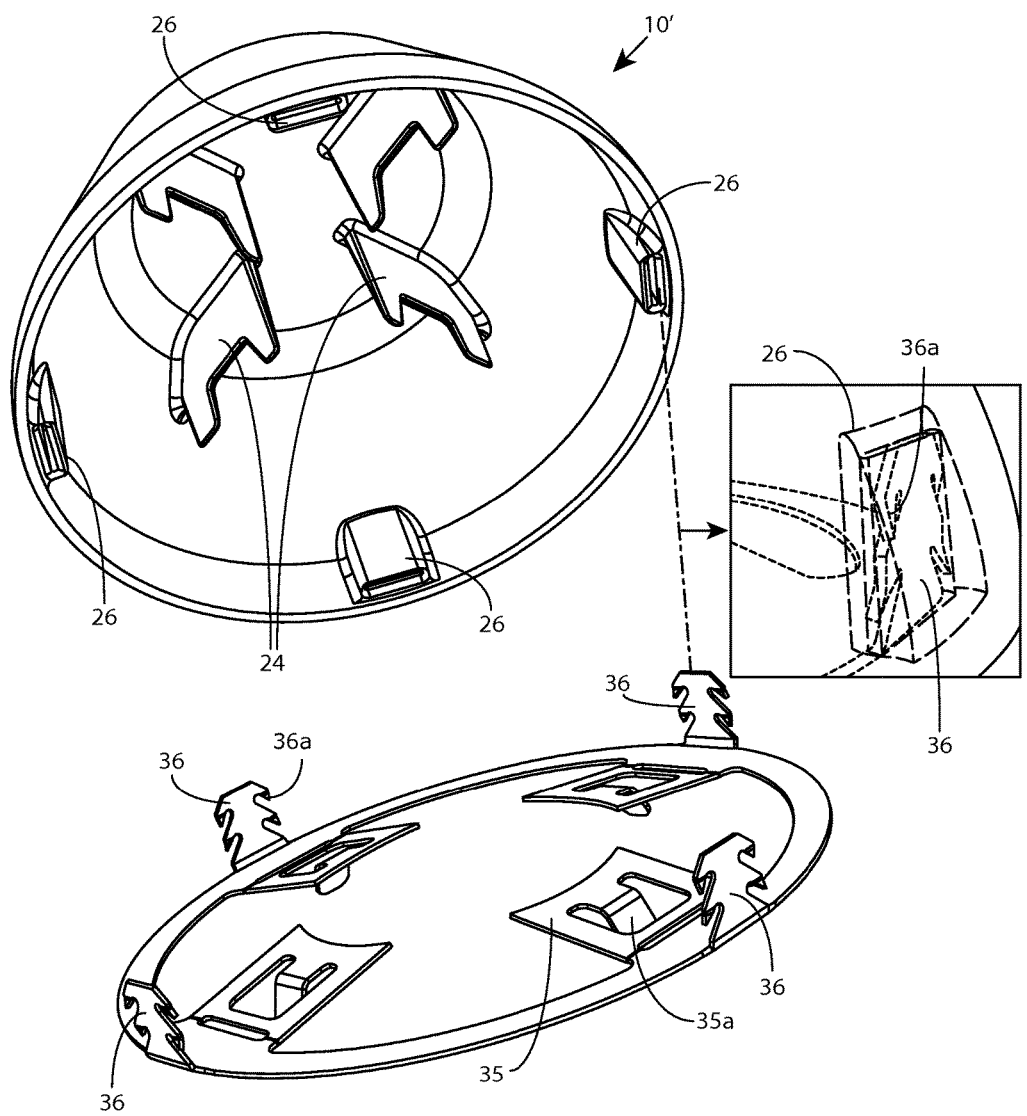
FIG. 9 shows an exploded view of the example vent cap assembly of FIG. 8A.

FIG. 9 shows an exploded view of cap 20 and mounting bracket 31 of cap assembly 10', in which the corresponding attachment features can be seen in more detail. The attachment features of mounting bracket 30 are defined as a plurality of upwardly extending retention tabs 36, each retention tab including barbs 36a angled in a downward direction. The corresponding attachment features of cap 20 are defined as receptacles or retention slots 26 dimensioned to fittingly receive retention tabs 36. Upon insertion of barbed tabs 36 into slots 26, barbs 36a engage opposing side-walls of corresponding retention slots 26 thereby retaining tabs 36 within the receptacles. In this embodiment, retention tabs 36 can be formed integrally with the mounting bracket, for example formed as a single components stamped from a sheet of metal (e.g. aluminum, stainless steel), although it is appreciated that the plurality of tabs may be formed of various other materials or may be separate components attached to the mounting bracket by various other means (e.g. screws, rivets).

In one aspect, cap 20 and mounting bracket 30 are formed of differing materials. For example, cap 20 may be formed of a thermoplastic or composite resin material, while the mounting bracket can be formed of a metal alloy (e.g. aluminum, stainless steel). In one aspect, cap 20 is formed of a more malleable material than that of the mounting bracket such that one or more barbed features of the mounting bracket embed into the material of the cap when the cap and mounting bracket are pressed together. This aspect further improves attachment between the cap and mounting bracket.

In another aspect, plurality of tabs 35 of mounting bracket may include a finger 35a that extends downwardly and angled outward away from the center of the mounting bracket ring 31, as shown in FIG. 9. Fingers 35a facilitate alignment and deflection of the plurality of tabs 35 to improve centering and leveling of cap assembly 10' when mounting to vent pipe 301.

Figure 10:
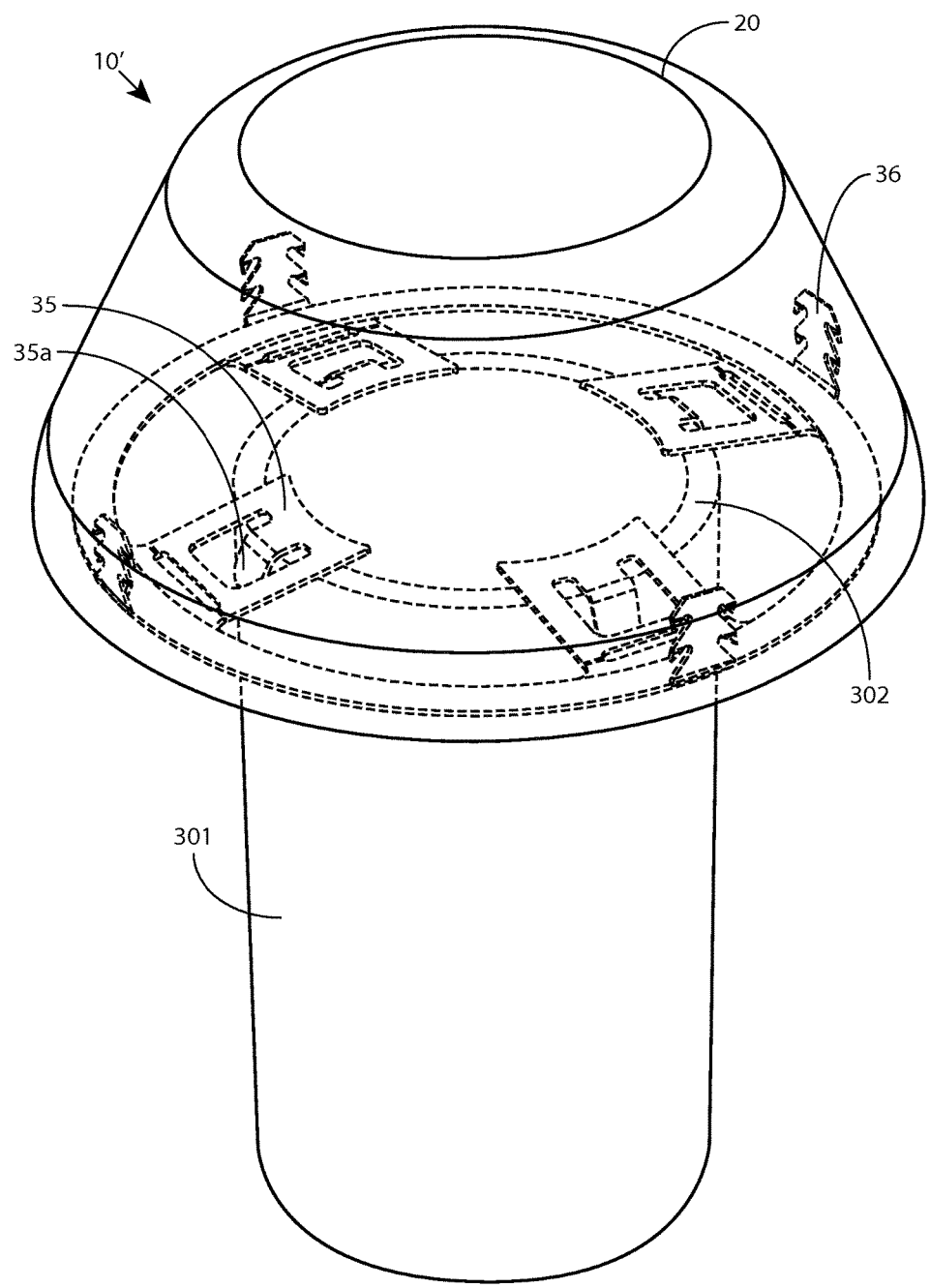
FIG. 10 shows the example vent cap assembly of FIG. 8A centered on a vent pipe before mounting in accordance with some embodiments.
Figure 11A:
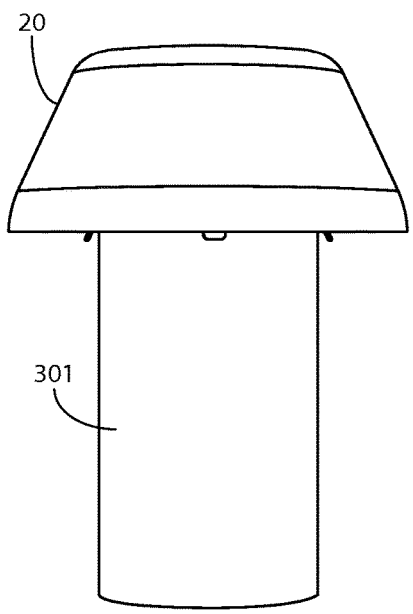
FIGS. 11A-11B and 12A-12B show side views of the vent cap assembly of FIG. 8A before and after mounting to a vent pipe, respectively, in accordance with some embodiments.
Figure 11B:
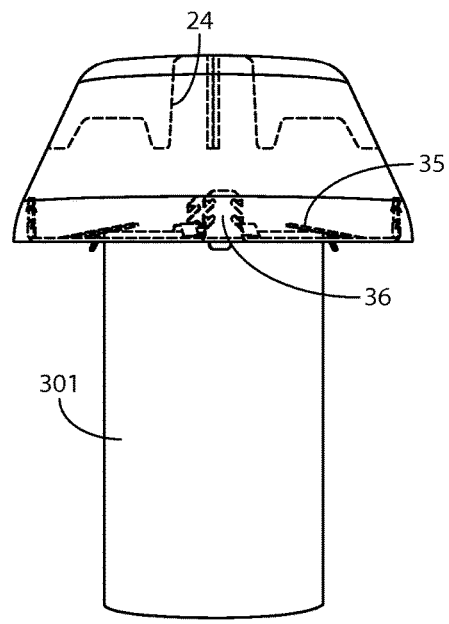
Figure 12A:
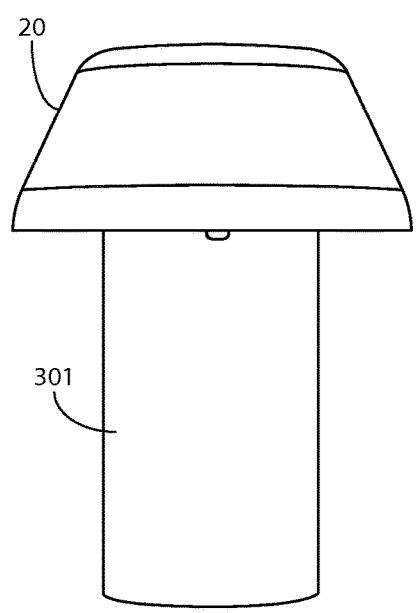
Figure 12B:
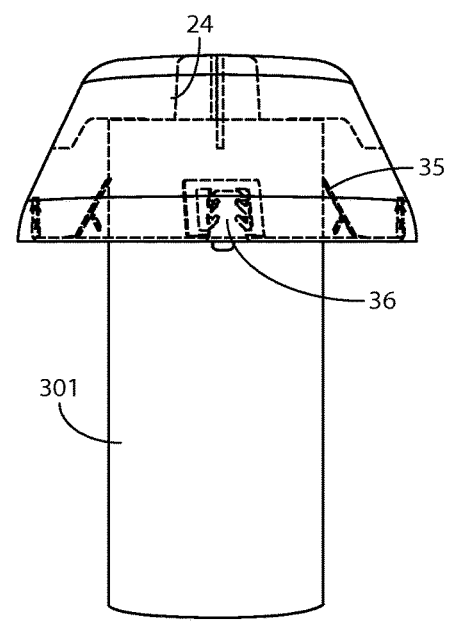

For example, as shown in FIG. 10 and the side views of FIGS. 11A-11B, cap assembly 10' can be initially placed on end of vent pipe 301 with the fingers 35a engaging the top outer edge of vent pipe 301 to ensure cap assembly is properly centered on vent pipe 301. The user then presses cap assembly 10' downward until the top edge of vent pipe 301 abuts against ribs 24 on an inside of the inner cavity of cap 20, as shown in the side views of FIGS. 12A-12B. This feature ensures sufficient airflow is maintained through the exit opening of vent pipe 301 as well as ensuring that the end of vent pipe 301 is inserted far enough into the cavity to prevent debris from entering vent pipe 301. When cap assembly 10' is pressed onto vent pipe 301, tabs 35 deflect upwards and plastically deform to the deflected position so as to engage the outer surface of vent pipe 301 with sufficient force to retain cap assembly 10'.

Figure 13A:
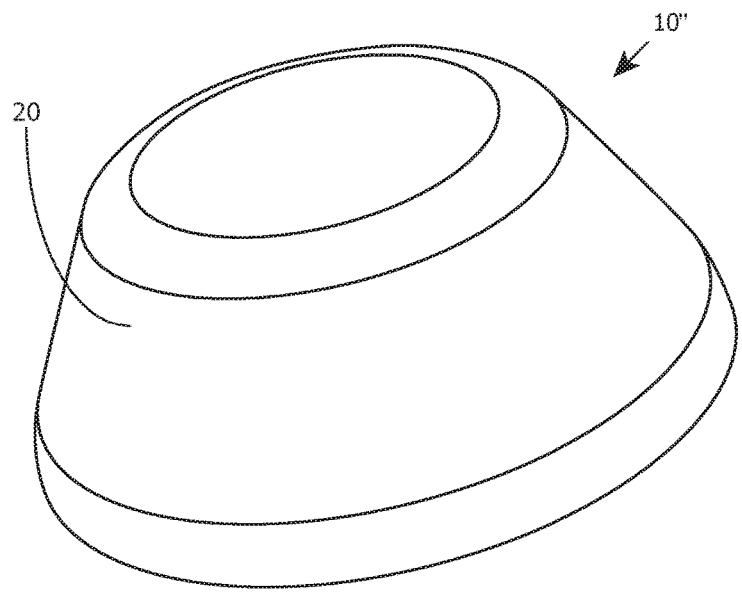
FIGS. 13A and 13B show top and bottom views, respectively, of another example vent cap assembly for use with roof-mounted photovoltaic systems in accordance with some embodiments.
Figure 13B:
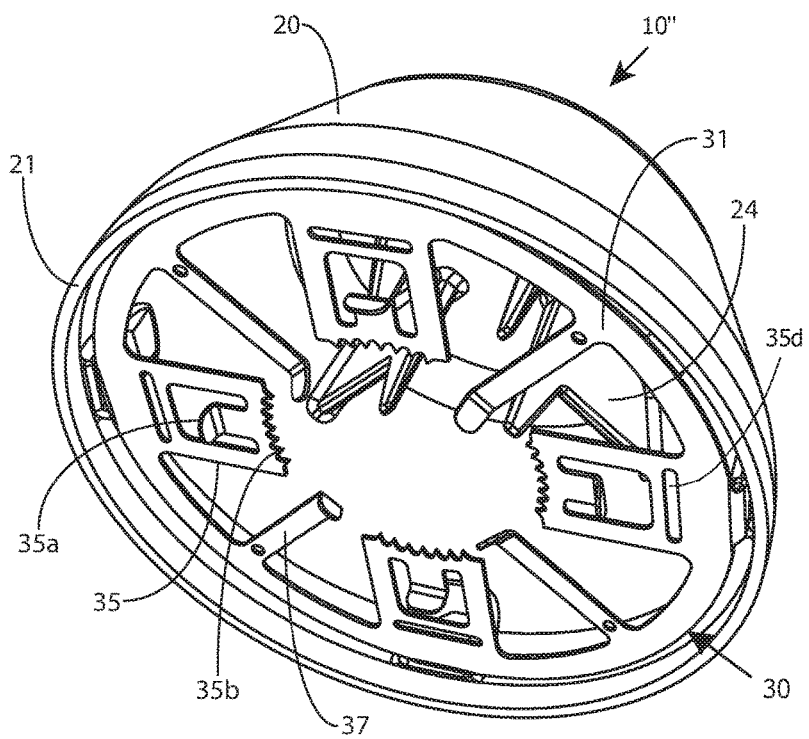
Figure 14:
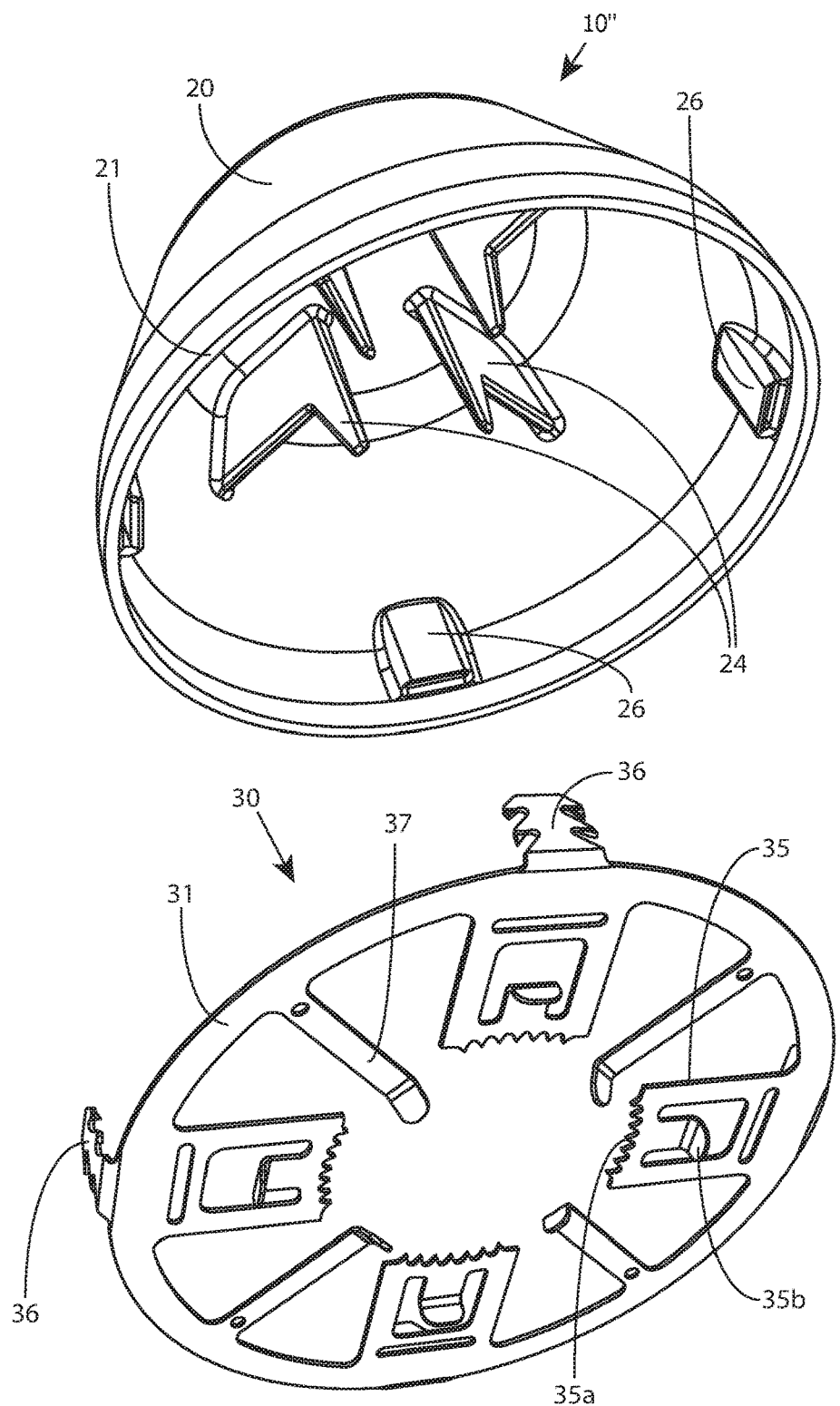
FIG. 14 show an exploded view of the example vent cap assembly of FIG. 13A.

FIGS. 13A and 13B show top and bottom views, respectively, of another example cap vent assembly 10" for use with roof-mounted photovoltaic systems in accordance with some embodiments. This embodiment is similar to that described above in FIGS. 8A-8B except mounting bracket 30 includes additional features and modifications to tabs 35. As can be in seen in various embodiments described herein, the tabs can include certain features to facilitate bending of the tabs and retention on the vent pipe. In one aspect, the tabs can include an area near a base of the tab that is configured to facilitate bending. This area may include a scored region, a hinge, a void or a portion having reduced thickness that facilitates bending. For example, as seen in the mounting bracket 31 of FIG. 13B, the base area of the tab includes a slot 35*d* that directs bending of the tab 35 along the base region of the tab. In another aspect, tabs may be configured with an additional retaining feature at the distal ends of the tabs that further improves retention of the mounted cap on the vent pipe by increasing friction between the tab and the vent pipe. Such features may include a rubberized portion, an adhesive portion, or a high friction region having texture or serrations. For example, as seen in the mounting bracket of FIG. 13B, tabs 35 have been modified to include serrated distal edge 35*b* so as further increase friction and engagement between tabs 35 and the outer surface of vent pipe 301, thereby further improving retention provided by mounting bracket. Mounting bracket 35 has been further modified to include alignment tabs 37 that extend inwardly toward the center of mounting bracket ring 31 further than plurality of tabs 35. Alignment tabs 37 improve alignment and centering of cap assembly 10" when mounted on vent pipes of reduced diameters. These alignment tabs 37 function in a similar manner as fingers 35*a* described above, but engage an inside of the pipe allow for centering on the interior diameter of vent pipes of even smaller diameters, for example a 1.5" diameter vent pipe. These features are shown in more detail in the exploded view of FIG. 14. In this embodiment, the distal edge of alignment tabs 37 are angled downward so as to engage the top interior edge of the vent pipe during installation. It is appreciated that these alignment features can be configured to facilitate centering by engaging the inside surface and/or the outside surface of the vent pipe.

Figure 15A:
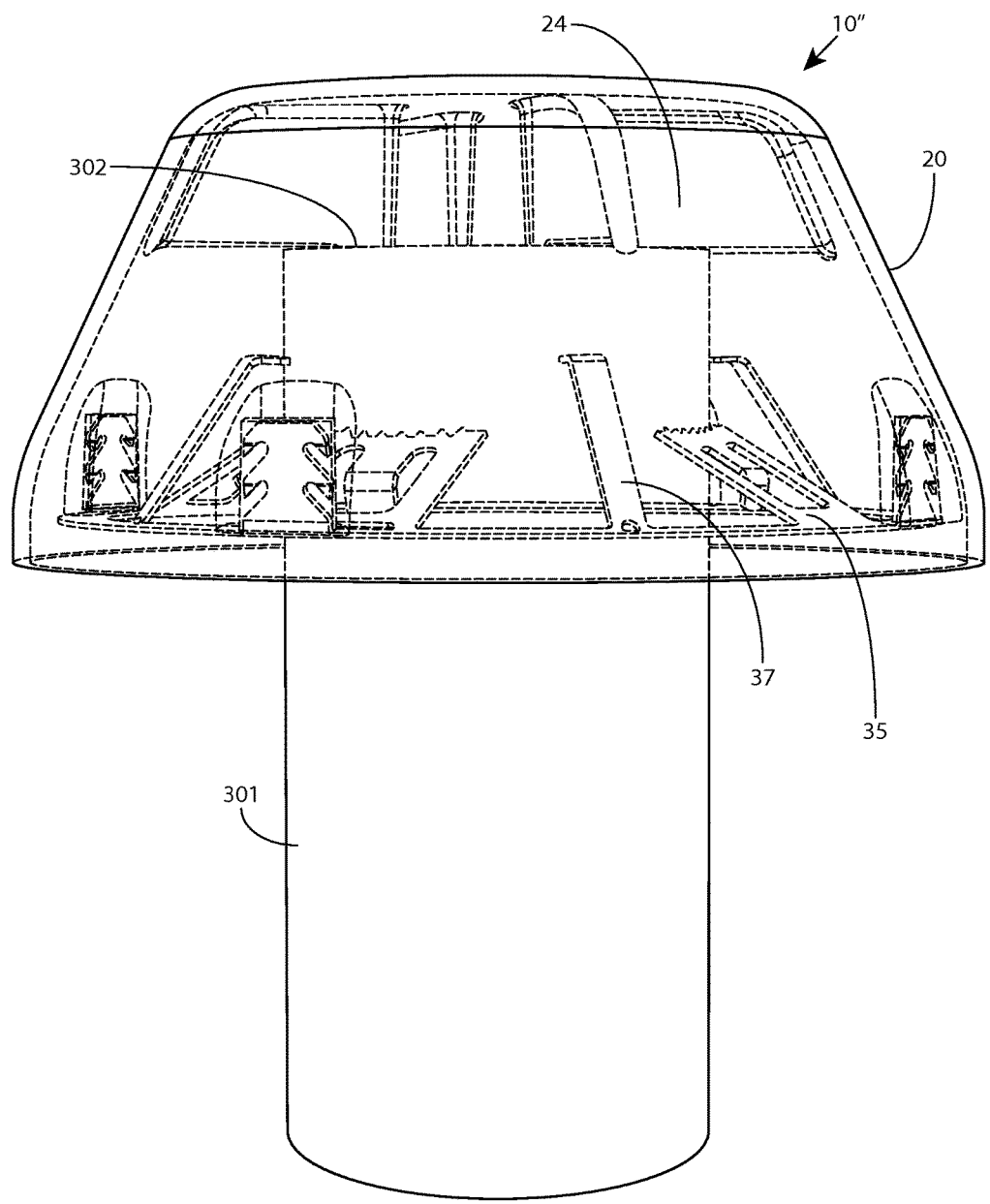
FIGS. 15A and 15B show a side view and a cross-sectional view, respectively, of vent cap assembly of FIG. 13A mounted to a vent pipe in accordance with some embodiments.
Figure 15B:
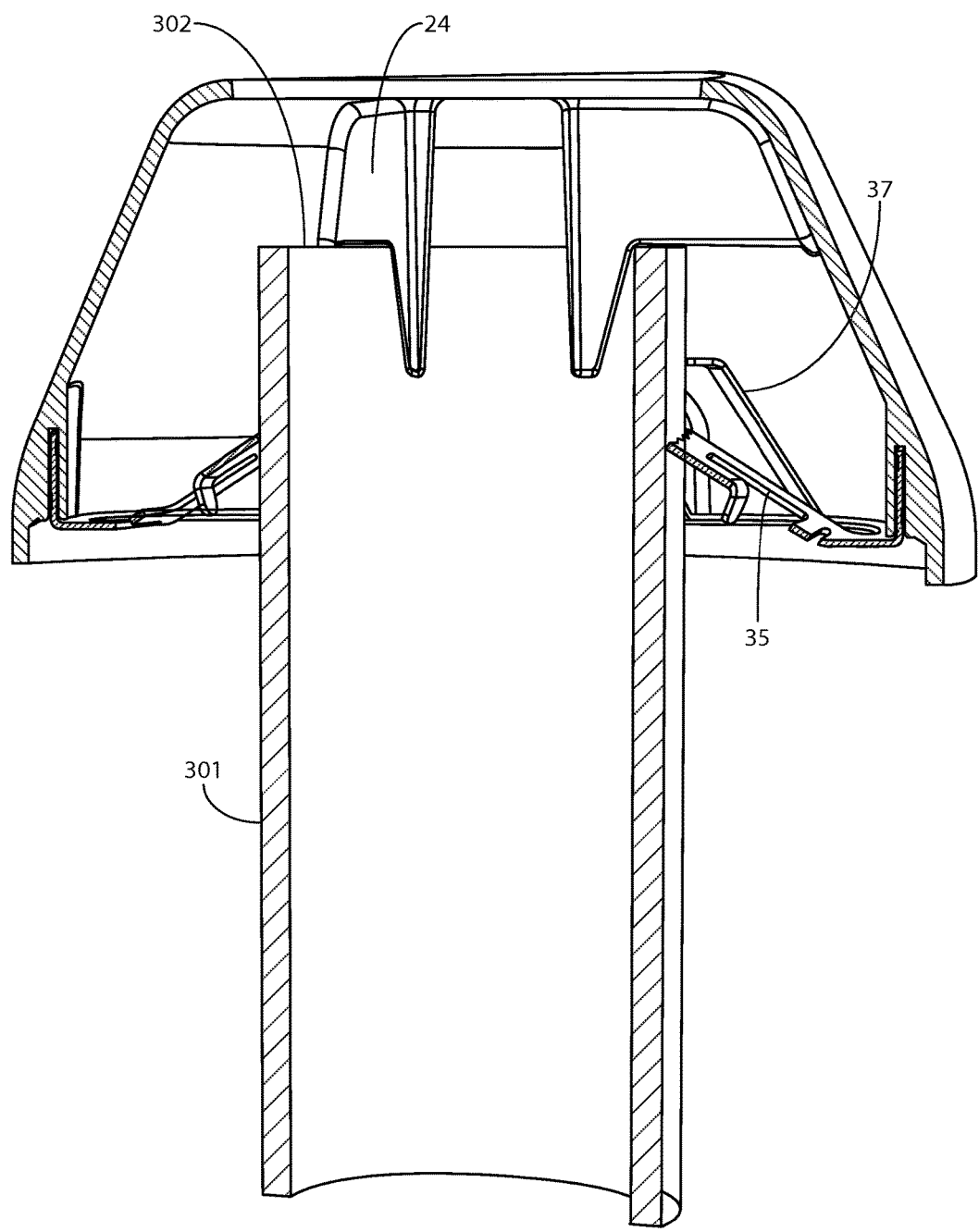

FIGS. 15A-15B show side views of cap assembly 10" mounted on vent pipe 301. As can be seen, after installation, alignment tabs 37 are positioned below the top edge such that retention of cap assembly 10" is provided largely by the plurality of tabs 35. It is appreciated that these or similar features may be included on any of the mounting brackets in any of the embodiments described herein. In some embodiments, the mounting bracket and cap are configured so that the rim of the cap along the underside opening of the cap extends further than where the mounting bracket couples with the cap, as can be seen in FIG. 15A. Such a configuration allows the assembled cap to be placed on a flat surface without deflecting the tables, which prevents damage when shipping the assembled caps.

Figure 16A:
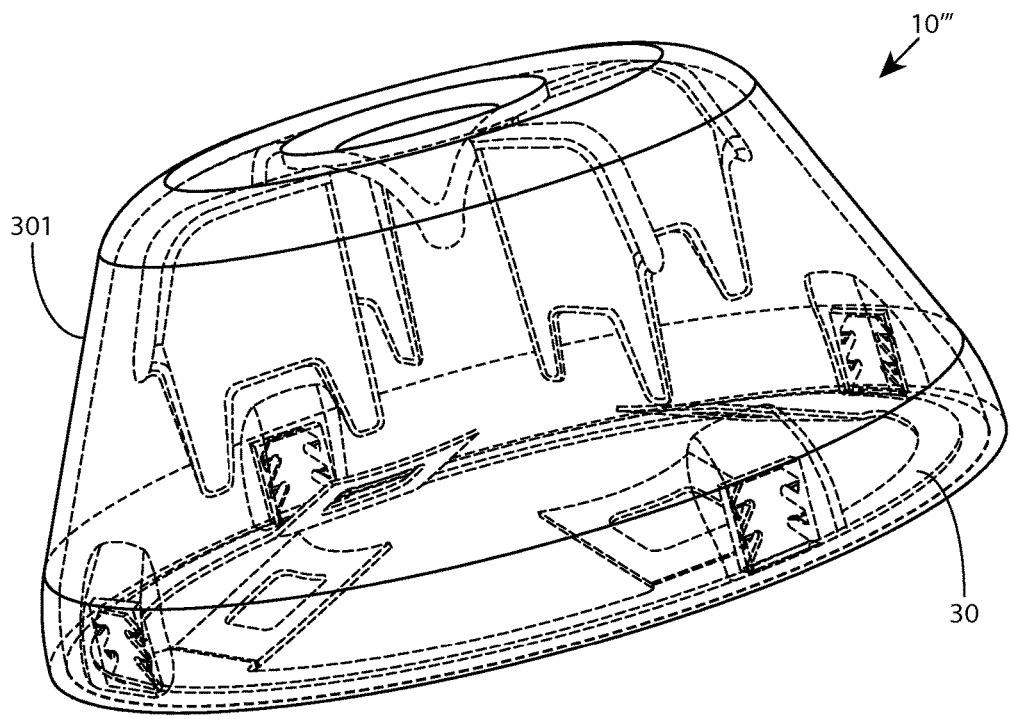
FIG. 16A shows another example vent cap assembly for use with roof-mounted photovoltaic systems in accordance with some embodiments.
Figure 16B:
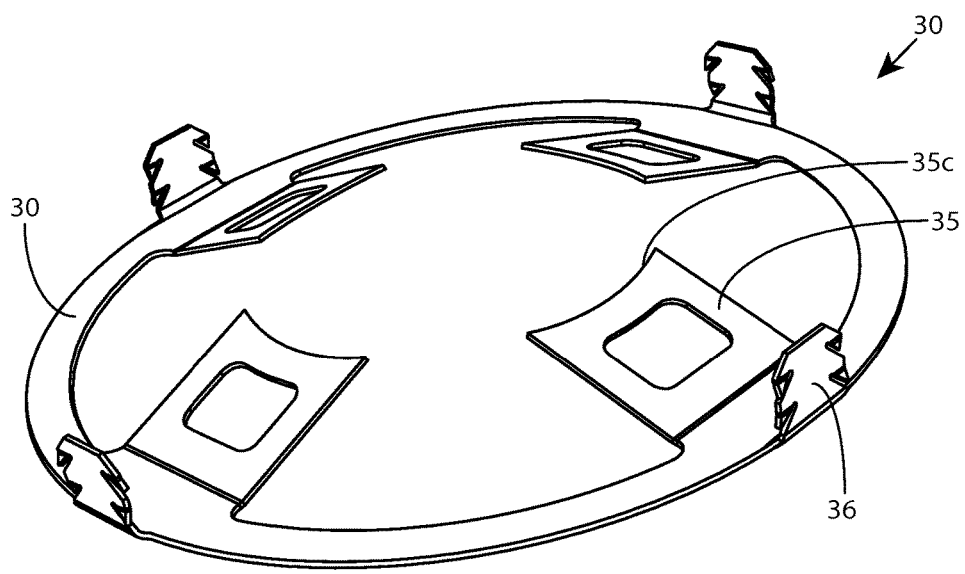
FIG. 16B shows a detail view of a mounting bracket of the vent cap assembly of FIG. 16A.

FIG. 16 shows another example vent cap assembly 10''' for use with roof-mounted photovoltaic systems in accordance with some embodiments. This embodiment is similar to that shown in FIG. 10 except that the plurality of tabs 35 are without any alignment fingers, such as those described above. Tabs 35 do include, however, an inwardly curved distal edge 35*c* that corresponds to the outwardly curved surface of vent pipe 301. In addition, ribs 24 within the inner cavity of cap 20 are dimensioned so as to engage the top surface of vent pipe 301 and adapted to facilitate mounting on vent pipes of certain diameters or within a range of diameters. The ridges include flattened region 24*a* and ramped portions 24*b* on one or both ends of the flattened, central region 24*a*. Flattened region 24*a* corresponds to a range of acceptable diameters of vent pipes 301 for which vent cap assembly 301 may be used. The ramped portions 24*b* facilitate alignment and centering during mounting of vent cap assembly by directing the top edge of vent pipe 301 to the central region of each rib when cap assembly 10''' is advanced over vent pipe 301.

Figure 17A:
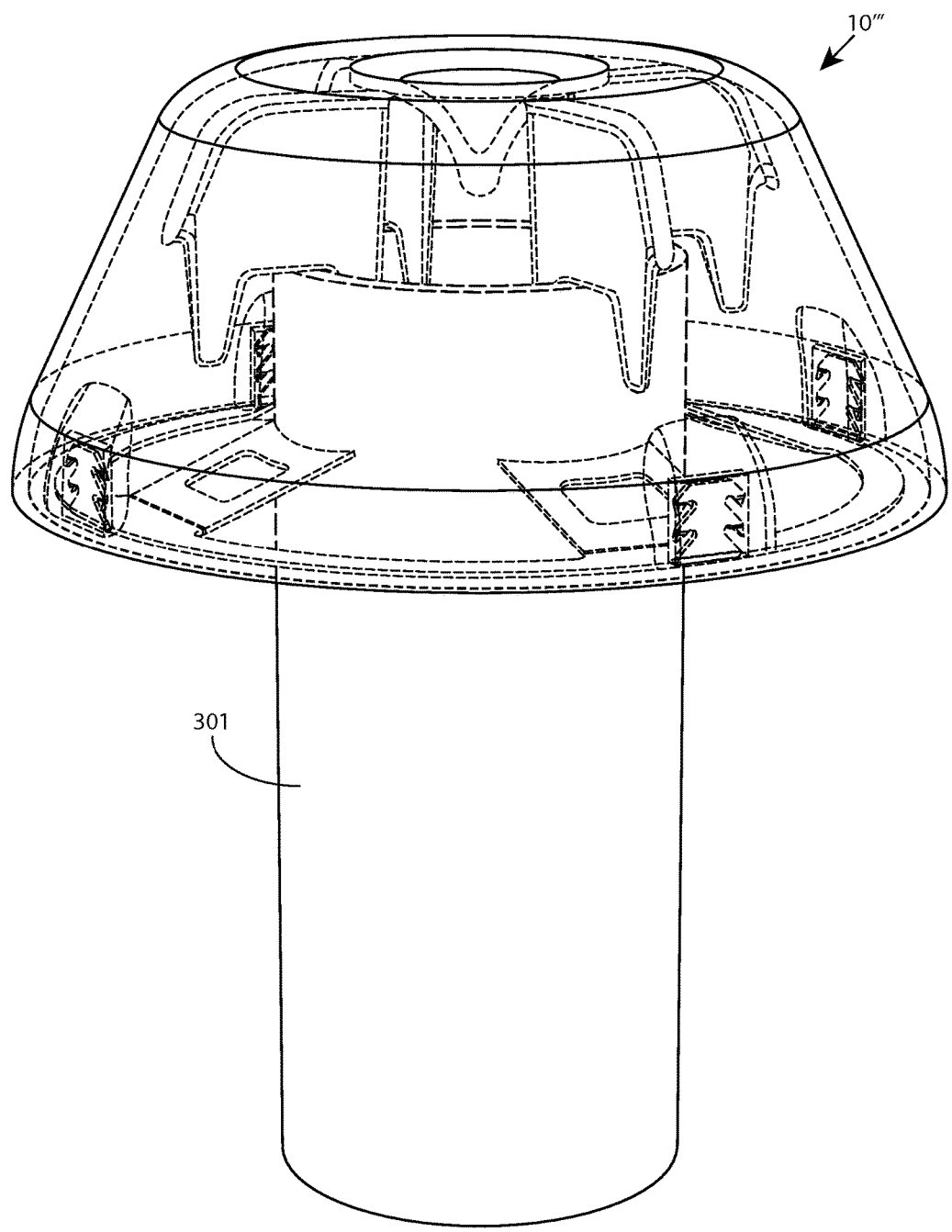
FIGS. 17A and 17B show a side view and a cross-sectional view, respectively, of the vent cap assembly of FIG. 16A mounted to a 1.5" diameter vent pipe in accordance with some embodiments.
Figure 17B:
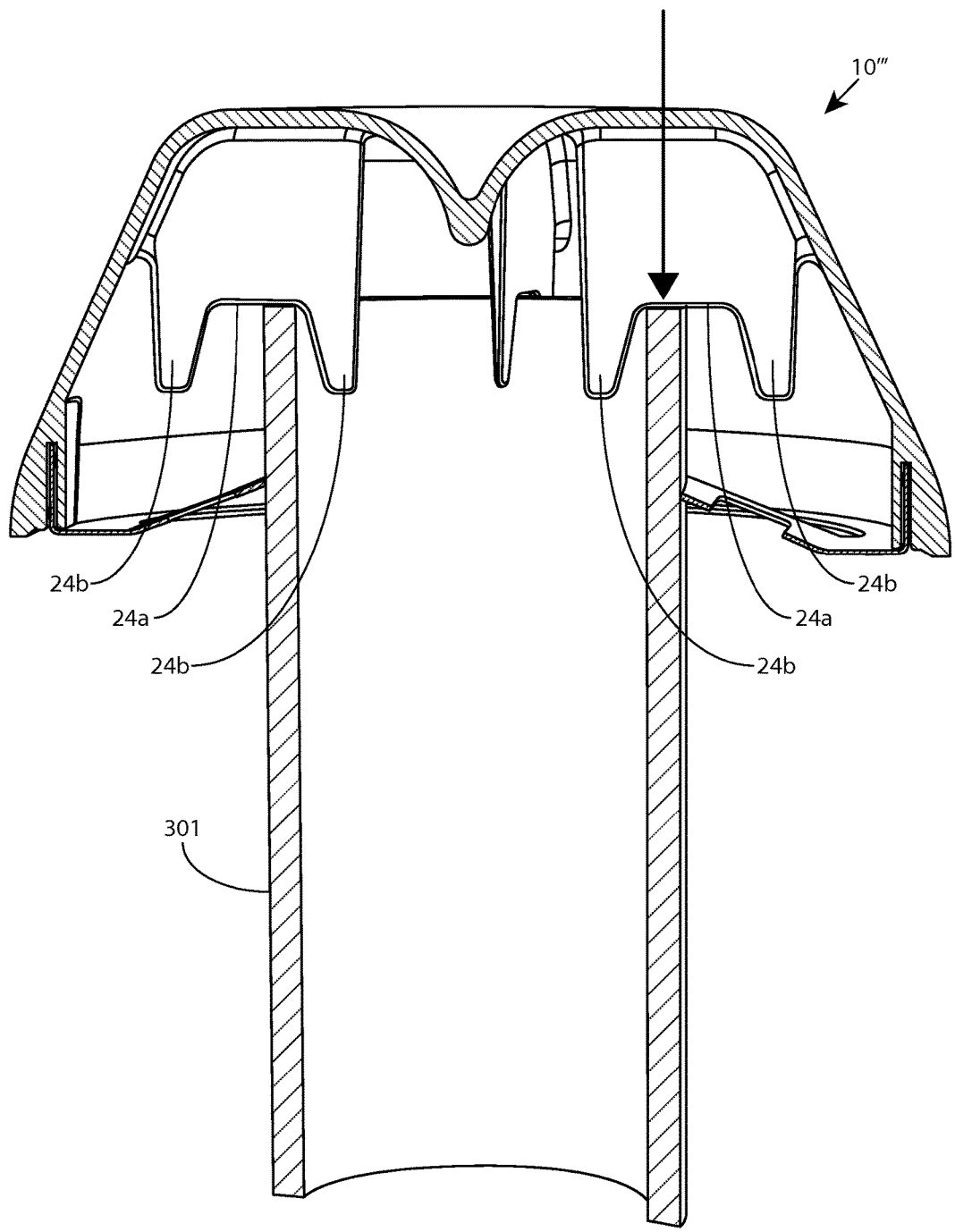
Figure 18A:
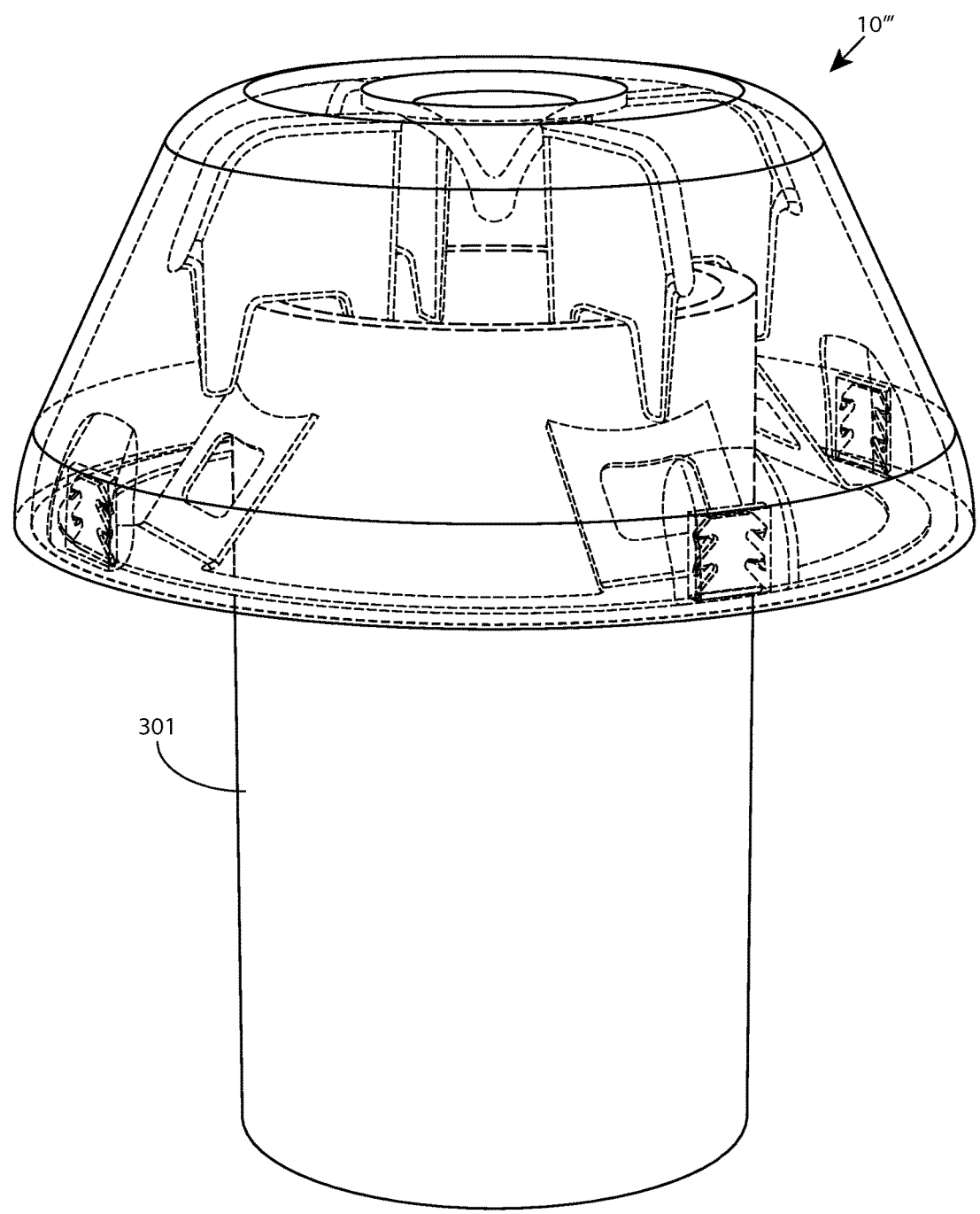
FIGS. 18A and 18B show a side view and a cross-sectional view, respectively, of the vent cap assembly of FIG. 16A mounted to a 2" diameter vent pipe in accordance with some embodiments.
Figure 18B:
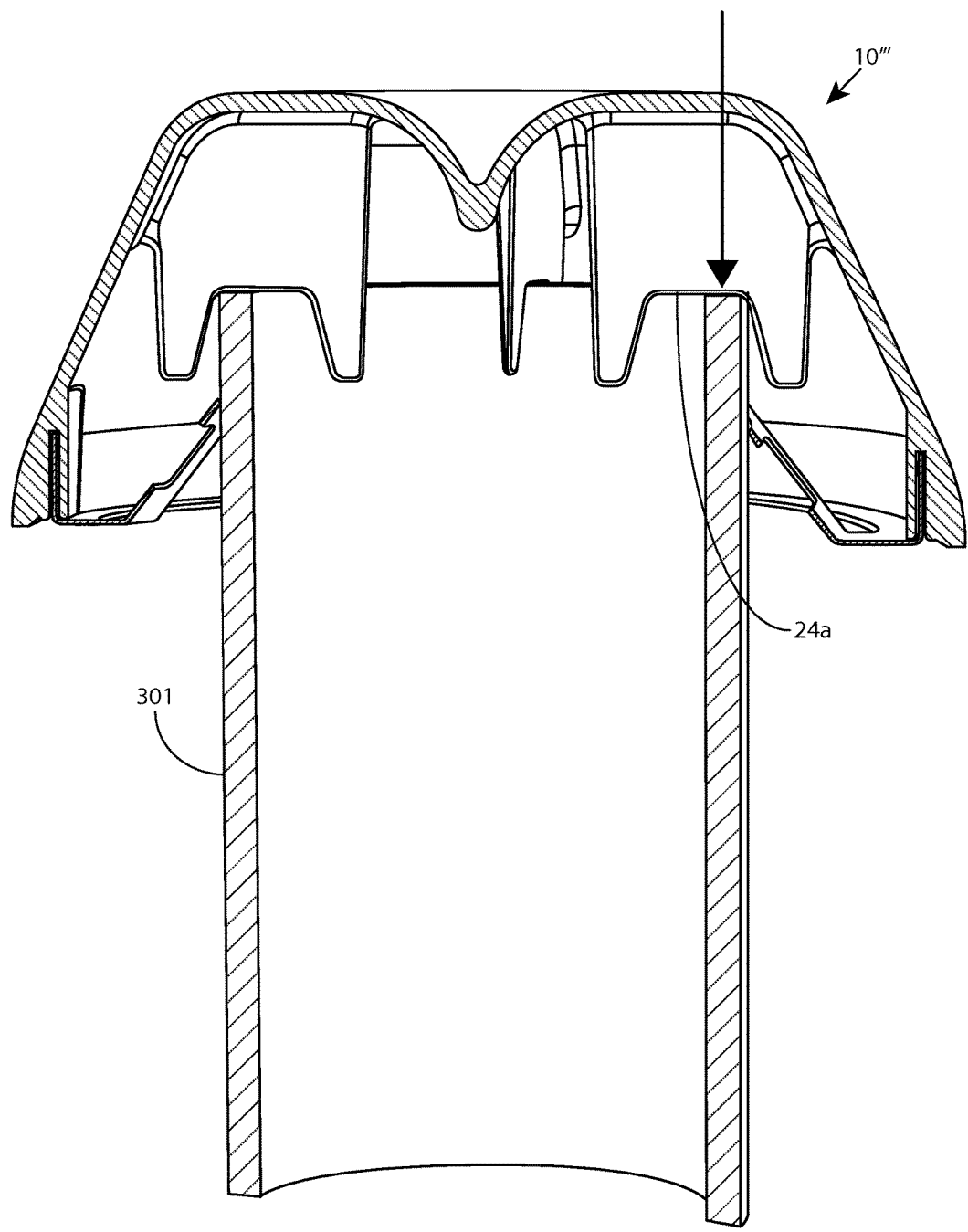

These aspects can be further understood by referring to the side view and cross-sectional views in FIGS. 17A-17B and FIGS. 18A-18B. FIGS. 17A-17B show vent cap assembly 10''' mounted on a 1.5-inch diameter vent pipe 301, in which the top edge of vent pipe 301 is abutted against an inside edge of center region 24*a* on each rib 24 of cap 20 (see arrow). FIGS. 18A-18B show the same vent cap assembly 10''' mounted on a 2-inch diameter vent pipe 301, in which the top edge of vent pipe 301 is abutted against an outer edge of center region 24*a* on each rib 24 of cap 20 (see arrow). These features are advantageous in allowing for improved alignment and centering on vent pipes of differing sizes such that the use of additional centering or alignment features (e.g. alignment tabs, fingers, etc.) are not required. It is appreciated, however, that these features may be utilized in various other embodiments as well as used in conjunction with any of the features described herein.

The embodiments of the present inventions should not be limited in scope by the embodiments described herein. For example, although many of the embodiments have been described with reference to shingle roofs, the principles herein are equally applicable to other types of roofs such as tile roofs. Indeed, various modifications of the embodiments of the present inventions, in addition to those described herein, will be apparent to those of ordinary skill in the art from the foregoing description and accompanying drawings and claims. Thus, such modifications are intended to fall within the scope of this invention. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, this disclosure should be construed in view of the full breath and spirit of the embodiments disclosed herein and claimed below.

What is claimed is:

1. A vent cap assembly for mounting to an exhaust vent pipe, the vent cap assembly comprising:
   a cap having a body defining an interior cavity, the cap having an opening to the interior cavity, the opening and interior cavity being dimensioned so as to receive an end of the exhaust vent pipe within the interior cavity through the opening; and
   a mounting bracket extending about a perimeter of the opening, wherein the mounting bracket includes one or more elongate members extending inwardly from the perimeter of the opening so as to engage an outer surface of the exhaust vent pipe sufficiently to secure the cap assembly to the exhaust vent pipe,
   wherein the cap is securely coupled to the mounting bracket by a coupling feature of the mounting bracket that couples to a corresponding coupling feature of the cap, the vent cap assembly being configured such that the cap and mounting bracket are assembled before mounting to the exhaust vent cap, and
   wherein the vent cap assembly is configured to be placed over the exhaust vent pipe and pressed onto the exhaust vent pipe thereby securing the vent cap assembly to the exhaust vent by engagement of the one or more elongate members of the mounting bracket with the exhaust vent pipe.

2. The vent cap assembly of claim 1 wherein each of the plurality of elongate members are laterally deflectable relative a longitudinal axis of the respective elongate member such that deflection of the elongate members upwards toward the interior cavity when the exhaust vent pipe is received facilitates retention of the exhaust vent pipe within the interior cavity.

3. The vent cap assembly of claim 1 wherein the plurality of elongate members are dimensioned so as to receive exhaust vent pipes of differing sizes.

4. The vent cap assembly of claim 1 wherein the plurality of elongate members are plastically deformable so as to retain the exhaust vent pipe within the interior cavity after being deflected upon receiving the exhaust vent pipe.

5. The vent cap assembly of claim 1 wherein the plurality of elongate members comprise a plurality of tabs adapted for engaging the outer surface of the exhaust vent pipe.

6. The vent cap assembly of claim 5 wherein each of the plurality of tabs includes an inwardly curved distal edge.

7. The vent cap assembly of claim 1 wherein the cap includes one or more ribs within the interior cavity opposite the opening, the one or more ribs adapted to engage the end of the exhaust vent pipe so as to maintain sufficient clearance between the end of the exhaust vent pipe and an inside surface of the cavity.

8. The vent cap assembly of claim 1 wherein the cap comprises a substantially smooth outer surface and convex shape so as to shed rain and inhibit collection of debris when secured on the exhaust vent pipe.

9. The vent cap assembly of claim 1 wherein the mounting bracket is secured just inside the opening such that the outer surface of the cap extends below the mounting bracket when the assembly is secured on the exhaust vent pipe.

10. The vent cap assembly of claim 1 wherein the plurality of elongate members includes three or more elongate members distributed about the perimeter so as to distribute anchoring by the elongate members about the exhaust vent pipe.

11. The vent cap assembly of claim 10 wherein each elongate member has a gripping surface for engaging the outer surface of the exhaust vent pipe.

12. The vent cap assembly of claim 11 wherein the gripping surface comprises a serrated distal edge of the respective elongate member.

13. The vent cap assembly of claim 1 wherein the coupling feature of the bracket comprise a plurality of retention tabs protruding in an upwards direction from the mounting bracket and the corresponding coupling feature of the cap comprises a plurality of slots configured for receiving the plurality of retention tabs.

14. The vent cap assembly of claim 13 wherein the plurality of retention tabs have barbs angled in a downward direction towards the mounting bracket to facilitate retention of the plurality of retention tabs within the slots once received therein.

15. The vent cap assembly of claim 1, wherein the vent cap assembly is configured to securely mount to the exhaust vent pipe without requiring any set-screws.

16. A vent cap assembly comprising:
  a cap portion having an opening to an interior cavity, the opening and interior cavity being dimensioned so as to receive an end of a vent pipe within the interior cavity through the opening, the interior cavity including a spacer to maintain an air gap between the end of the vent pipe and an underside of the cap portion; and
  a mounting bracket attached to the cap portion and extending at least partly about a perimeter of the opening, wherein the mounting bracket includes a plurality of flanges extending inwardly from the perimeter of the opening so as to engage an outer surface of the vent pipe sufficiently to secure the cap assembly to the vent pipe, wherein at least two of the plurality of flanges extend inwardly from the perimeter at different lengths to accommodate vent pipes of different diameters,
  wherein the cap and mounting bracket are separate components coupled together before mounting to the exhaust vent cap;
  wherein the vent cap assembly is configured to be placed over the vent pipe and pressed onto the vent pipe thereby securing the vent cap assembly to the exhaust gas vent by engagement of the plurality of flanges of the mounting bracket with the vent pipe.

17. The vent cap assembly of claim 16 wherein the mounting bracket includes a plurality of barbed coupling features for fixedly securing the mounting bracket within the interior cavity of the cap portion.

18. The vent cap assembly of claim 16 wherein the spacer includes one or more ribs within the interior cavity opposite the opening configured to abut against an edge of a vent pipe opening of the vent pipe.

19. The vent cap assembly of claim 18 wherein each of the one or more ribs include a recessed central region dimensioned to receive an edge of the vent pipe opening.

20. The vent cap assembly of claim 19 wherein the recessed central region is dimensioned so as to receive the edge of the end of vent pipes of differing diameters within a pre-determined range of vent pipe diameters.

* * * * *